US012668422B2

(12) United States Patent
Force et al.

(10) Patent No.: US 12,668,422 B2
(45) Date of Patent: Jun. 30, 2026

(54) SORTATION OF ITEMS USING AN IMAGE FINGERPRINT TO RIGHT THE ITEMS

(71) Applicant: United States Postal Service, Washington, DC (US)

(72) Inventors: Jason Force, Annandale, VA (US); Wayne R. Perry-Eaton, Leesburg, VA (US)

(73) Assignee: United States Postal Service, Washington, DC (US)

( * ) Notice: Subject to any disclaimer, the term of this patent is extended or adjusted under 35 U.S.C. 154(b) by 406 days.

(21) Appl. No.: 18/530,024

(22) Filed: Dec. 5, 2023

(65) Prior Publication Data

US 2024/0182242 A1 Jun. 6, 2024

Related U.S. Application Data

(60) Provisional application No. 63/386,302, filed on Dec. 6, 2022.

(51) Int. Cl.
B65G 1/04 (2006.01)
B65G 1/00 (2006.01)
(Continued)

(52) U.S. Cl.
CPC ........... B65G 1/0485 (2013.01); B65G 43/08 (2013.01); B65G 47/24 (2013.01); B65G 61/00 (2013.01);
(Continued)

(58) Field of Classification Search
CPC ...... B65G 1/0485; B65G 43/08; B65G 47/24; B65G 61/00; B65G 2201/0285;
(Continued)

(56) References Cited

U.S. PATENT DOCUMENTS

| | | | |
|---|---|---|---|
| 4,577,852 A | 3/1986 | Grunder | |
| 5,252,024 A | 10/1993 | Breda et al. | |

(Continued)

FOREIGN PATENT DOCUMENTS

| | | | |
|---|---|---|---|
| DE | 10 2012 2199912 A1 | 4/2014 | |
| FR | 2 706 331 A1 | 12/1994 | |
| WO | WO 99/20530 A1 | 4/1999 | |

OTHER PUBLICATIONS

International Search Report and Written Opinion mailed Dec. 11, 2018 in International Application No. PCT/US2018/049762 filed Sep. 6, 2018.

(Continued)

*Primary Examiner* — Thomas Randazzo
(74) *Attorney, Agent, or Firm* — Knobbe, Martens, Olson & Bear, LLP

(57) ABSTRACT

An automated system for transferring articles from a container. An item transfer system includes a source tray assembly, a translatable and rotatable intermediate rotary assembly, and a translatable and rotatable output rotary assembly. The system is configured to transfer articles from the tray to processing equipment by an automated process including rotationally transferring the articles from the tray to the intermediate rotary assembly and rotationally transferring the articles from the intermediate rotary assembly to the output rotary assembly. The output rotary assembly can move to align with a shelf or other input of the processing equipment and a paddle assembly can slide the items from the output rotary assembly onto the shelf or other input of the processing equipment.

20 Claims, 11 Drawing Sheets

(51) Int. Cl.

| | |
|---|---|
| *B65G 43/08* | (2006.01) |
| *B65G 47/24* | (2006.01) |
| *B65G 61/00* | (2006.01) |
| *G06T 7/00* | (2017.01) |
| *G06T 7/13* | (2017.01) |
| *G06T 7/60* | (2017.01) |
| *G06T 7/73* | (2017.01) |
| *G06V 20/52* | (2022.01) |

(52) U.S. Cl.
CPC .............. *G06T 7/0002* (2013.01); *G06T 7/13* (2017.01); *G06T 7/60* (2013.01); *G06T 7/73* (2017.01); *G06V 20/52* (2022.01); *B65G 2201/0285* (2013.01); *B65G 2203/0216* (2013.01); *B65G 2203/0225* (2013.01); *B65G 2203/0241* (2013.01); *B65G 2203/0266* (2013.01); *B65G 2203/041* (2013.01); *G06T 2207/30204* (2013.01); *G06T 2207/30232* (2013.01); *G06T 2207/30242* (2013.01)

(58) Field of Classification Search
CPC .... B65G 2203/0216; B65G 2203/0225; B65G 2203/0241; B65G 2203/0266; B65G 2203/041; B65G 2207/46; G06T 7/0002; G06T 7/13; G06T 7/60; G06T 7/73; G06T 2207/30204; G06T 2207/30232; G06T 2207/30242; G06V 20/52
See application file for complete search history.

(56) References Cited

U.S. PATENT DOCUMENTS

| | | | |
|---|---|---|---|
| 5,271,710 A | | 12/1993 | Decharran et al. |
| 5,299,793 A | | 4/1994 | Couturier |
| 5,609,333 A | * | 3/1997 | Mandel .................. B65H 43/06 |
| | | | 270/58.11 |
| 5,906,468 A | | 5/1999 | Vander Syde et al. |
| 5,993,132 A | | 11/1999 | Harres et al. |
| 6,217,274 B1 | | 4/2001 | Svyatsky et al. |
| 6,536,191 B1 | * | 3/2003 | Ruggiero ................ B07C 1/025 |
| | | | 53/250 |
| 6,840,513 B1 | * | 1/2005 | Rabindran ............. B65H 29/18 |
| | | | 271/215 |
| 7,112,031 B2 | | 9/2006 | Harres et al. |
| 7,544,038 B2 | | 6/2009 | Gerding et al. |
| 7,553,119 B2 | | 6/2009 | Good et al. |
| 7,572,094 B2 | | 8/2009 | Miskiewicz et al. |
| 7,866,936 B2 | | 1/2011 | Schuck et al. |
| 7,980,383 B2 | | 7/2011 | Doepker |
| 8,141,133 B2 | | 3/2012 | Pagan |
| 8,142,133 B2 | | 3/2012 | Neebe et al. |
| 8,172,498 B2 | | 5/2012 | Enenkel |
| 8,807,912 B2 | | 8/2014 | Liebheit |
| 9,546,009 B2 | | 1/2017 | Hagelovist et al. |
| 9,840,379 B2 | * | 12/2017 | Yang ...................... B65B 43/54 |
| 10,167,150 B2 | | 1/2019 | Gugel et al. |
| 10,233,039 B2 | | 3/2019 | Miyoshi et al. |
| 10,421,564 B2 | * | 9/2019 | Yang ..................... B65G 65/00 |
| 10,889,440 B2 | | 1/2021 | Perry-Eaton et al. |
| 11,352,227 B2 | | 6/2022 | Perry-Eaton et al. |
| 2009/0087295 A1 | | 4/2009 | Fritzsche |
| 2010/0290867 A1 | | 11/2010 | Nice et al. |
| 2013/0247524 A1 | | 9/2013 | Ford et al. |
| 2019/0077598 A1 | | 3/2019 | Perry-Eaton et al. |
| 2020/0130933 A1 | | 4/2020 | Mattern et al. |
| 2020/0338755 A1 | | 10/2020 | Behringer |
| 2020/0361723 A1 | | 11/2020 | Perry-Eaton et al. |
| 2021/0074111 A1 | | 3/2021 | Sperl et al. |
| 2021/0130093 A1 | | 5/2021 | Perry-Eaton et al. |
| 2022/0089381 A1 | | 3/2022 | Perry-Eaton |
| 2022/0297966 A1 | | 9/2022 | Perry-Eaton et al. |
| 2022/0332527 A1 | | 10/2022 | Perry-Eaton et al. |

OTHER PUBLICATIONS

International Preliminary Report on Patentability mailed Mar. 19, 2020 in International Application No. PCT/US2018/049762 filed Sep. 6, 2018.

* cited by examiner

600

602
Receive items at the
output rotary assembly

604
Initiate item compression cycle

606
Scan items

608
Mail
righted
?

No

Yes

610
End process

SORTATION OF ITEMS USING AN IMAGE FINGERPRINT TO RIGHT THE ITEMS

CROSS-REFERENCE TO RELATED APPLICATIONS

This application claims the benefit of U.S. Provisional Application Ser. No. 63/386,302, filed Dec. 6, 2022, titled "SORTATION OF ITEMS USING AN IMAGE FINGER-PRINT TO RIGHT THE ITEMS," the entirety of which is incorporated by reference herein.

Any and all applications for which a foreign or domestic priority claim is identified in the Application Data Sheet as filed with the present application are hereby incorporated by reference under 37 CFR 1.57 for all purposes and for all that they contain.

FIELD

The disclosure relates to systems and methods for using an image to right the items of an item processing apparatus.

DESCRIPTION OF THE RELATED TECHNOLOGY

Items, such as letters, envelopes, postcards, etc., may be received, transported, transferred, processed, collected, sorted, or the like, in containers such as trays. Items may be removed from trays at various stages of transport and processing.

SUMMARY

The system and methods of this disclosure each have several innovative aspects, no single one of which is solely responsible for its desirable attributes. Without limiting the scope as expressed by the claims that follow, its more prominent features will now be discussed briefly.

In a first aspect, an item processing system comprises a frame, a source tray assembly, a content transfer system, a tray measuring device, and a righting detection device. The tray content transfer system comprises both an intermediate rotary assembly, and an output rotary assembly. The source tray assembly is movably coupled to the frame and includes a retainer configured to releasably secure a tray within the source tray assembly. The source tray assembly is rotatable about a first axis.

The intermediate rotary assembly is movably coupled to the frame and is rotatable about a second axis parallel to the first axis, translatable along a horizontal axis perpendicular to the second axis, and translatable along a vertical axis perpendicular to the second axis and the horizontal axis. The intermediate rotary assembly includes a first platform having a plurality of first slots therethrough parallel to the second axis and a plurality of movable first fingers extending through the first slots and configured to support one or more items therebetween.

The output rotary assembly is movably coupled to the frame and is rotatable about a third axis parallel to the first axis, translatable along the horizontal axis, and translatable along the vertical axis. The output rotary assembly includes a second platform having a plurality of second slots therethrough parallel to the third axis and a plurality of movable second fingers extending through the second slots and configured to support the one or more items therebetween.

In some embodiments, the item processing system further includes a tray content transfer controller, a tray measuring device controller, and a righting detection controller. The tray content transfer controller, tray measuring device controller, and the righting detection controller are electrically coupled to one another via a network. The tray content transfer controller is configured to rotate the source tray assembly, the intermediate rotary assembly, and the output rotary assembly, to translate the intermediate rotary assembly and the output rotary assembly along the vertical axis and the horizontal axis, and to move the first fingers and the second fingers, in a predetermined sequence to transfer the one or more items from the tray to an output location.

The tray measuring device controller is configured to capture an image of a tray at the source tray intake, process the image to determine whether a tray exists at the source tray intake, and measure the quantity of items and/or length of a stack of items within a tray at the source tray intake. The tray measuring device controller is further configured communicate information regarding the tray presence and quantity of items and/or length of a stack of items within the tray to the tray content transfer controller. The tray content transfer controller may move the fingers of the intermediate rotary assembly to a predetermined position corresponding to a quantity of items and/or length of a stack of items within the tray, position the intermediate rotary assembly in a rotational orientation in which the first platform is parallel to a bottom surface of the tray, and simultaneously rotate the source tray intake and the intermediate rotary assembly to rotationally transfer the one or more items from the source tray intake to the intermediate rotary assembly.

The righting detection controller is configured to capture an image of a stack of items located at the intermediate rotary assembly and measure the average angle of the stack of items. The righting detection controller is further configured to communicate information regarding the average angle of a stack of items to the tray content transfer system. The tray content transfer system may be configured to initiate a sequence of mechanical steps to compress and release the fingers of the intermediate rotary assembly several times, before the righting detection controller repeats a righting measurement. The cycle of measuring and compressing items may persists until the righting detection controller determines that the items are sufficiently faced in the stack of the intermediate rotary assembly.

The tray content transfer controller is further configured to move the output rotary assembly to a position above the intermediate rotary assembly while moving the fingers of the output rotary assembly to a predetermined position corresponding to the quantity of items and/or length of a stack of items in the intermediate rotary assembly. Next the tray content transfer controller is configured to orient the second platform parallel to the first platform, and simultaneously rotate the intermediate rotary assembly and the output rotary assembly to rotationally transfer the one or more items from the intermediate rotary assembly to the output rotary assembly.

In another implementation, a second righting detection controller is configured to capture an image of a horizontal stack of items located at the output rotary assembly and measure the average angle of the stack of items. The second righting detection controller is further configured to communicate information regarding the average angle of the stack of items to the tray content transfer system. The tray content transfer system may initiate a sequence of mechanical steps to compress and release the fingers of the output rotary assembly several times, before the righting detection device controller repeats the righting measurement. The cycle of measuring and compressing items may persists until the righting detection controller determines that the items are sufficiently faced in the horizontal stack of the output rotary assembly.

In some embodiments, the tray content transfer controller is further configured to move the output rotary assembly to an output position in which a platform of the output rotary assembly is aligned with a shelf associated with an item processing apparatus, where the items are slidably transferred to the processing apparatus.

In some aspects, the techniques described herein relate to a system including: an assembly including: a platform having a plurality of slots, and a plurality of fingers extending through the plurality of slots, the plurality of fingers configured to support one or more items therebetween; one or more sensors configured to detect a characteristic associated with at least one item; and a controller configured to: receive, from the one or more sensors, the characteristic associated with at least one item; based on the received characteristic associated with the at least one item, determine a distance between the plurality of fingers; and move the plurality of fingers based on the determined distance.

In some aspects, the techniques described herein relate to a system, wherein the controller is further configured to: in response to receiving, from the one or more sensors, the characteristic associated with at least one item, determine a tray type at the assembly; estimate a quantity of items associated with the determined tray type; and based on the determined tray type and the estimated quantity of items associated with the tray type, determine a length of the items in a tray.

In some aspects, the techniques described herein relate to a system, wherein a first sensor of the one or more sensors is a tray detection device affixed such that a field of view of the tray detection device encompasses the one or more items at the assembly.

In some aspects, the techniques described herein relate to a system, wherein the controller is further configured to: generate an image of the assembly in response to receiving the characteristic associated with at least one item from the tray detection device, wherein the image of the assembly includes at least a tray and one or more items; process the image to determine a tray type for the tray; estimate, based on the processed image, a quantity of items in the tray; and determine a length of items in the tray based on the determined tray type and the estimated quantity of items in the tray.

In some aspects, the techniques described herein relate to a system, wherein the tray detection device further includes: a marker affixed such that the tray detection device field of view encompasses the assembly and the marker.

In some aspects, the techniques described herein relate to a system, wherein the controller is further configured to: generate an image of the assembly in response to receiving the characteristic associated with at least one item from the tray detection device, wherein the image of the assembly includes at least a tray; process the image to calculate an offset angle between the tray detection device and the assembly, the calculated offset angle determined based on one or more characteristics of the marker included in the image; based on the processed image and the offset angle, determine a tray type for the tray; estimate, based on the processed image and the offset angle, a quantity of items in the tray; and determine a length of the items in the tray based on the determined tray type and the estimated quantity of items in the tray.

In some aspects, the techniques described herein relate to a system, further including: a second assembly including: a second platform having a plurality of second slots, and a plurality of second fingers extending through the plurality of second slots, the plurality of second fingers configured to support the one or more items therebetween; wherein the controller is further configured to: move the plurality of second fingers based on the received characteristic associated with at least one item; and rotate the assembly and the second assembly, to translate the assembly and the second assembly in a predetermined sequence to transfer the one or more items from a tray to an output location.

In some aspects, the techniques described herein relate to a system, further including: at least a subset of the plurality of fingers are configured to retract from an extended position beyond the platform to a lowered position below the platform, the lowered position permitting items to slide along the platform over the retractable plurality of fingers.

In some aspects, the techniques described herein relate to a system, wherein the controller is further configured to: retract the subset of the plurality of fingers based on the received characteristic associated with at least one item.

In some aspects, the techniques described herein relate to a system, wherein the controller is further configured to: rotate the assembly, to translate the assembly in a predetermined sequence to transfer the one or more items from a tray to an output location.

In some aspects, the techniques described herein relate to a system including: an assembly including a platform having a plurality of slots, and a plurality of fingers extending through the plurality of slots, the plurality of fingers configured to support one or more items therebetween; one or more sensors configured to detect a characteristic associated with at least one item; and a controller, wherein the controller is configured to: receive, from the one or more sensors, the characteristic associated with at least one item; based on the received characteristic associated with the at least one item, determine an angle of the at least one item, and move the plurality of fingers based on the determined angle of the at least one item.

In some aspects, the techniques described herein relate to a system, wherein the controller is further configured to: determine an edge for at least one of the one or more items in response to receiving, from the one or more sensors, the characteristic associated with at least one item; estimate, based on the determined edge and a reference plane, a plurality of angles for the one or more items; and based on the determined edge and the estimated plurality of angles for the one or more items, determine an average angle of the one or more items.

In some aspects, the techniques described herein relate to a system, wherein a first sensor of the one or more sensors is an item righting detection device affixed such that a field of view of the item righting detection device encompasses the one or more items.

In some aspects, the techniques described herein relate to a system, wherein the controller is further configured to: generate an image of the one or more items in response to receiving, from the righting detection device, the characteristic associated with at least one item; process the image to determine an edge for at least one of the one or more items; estimate, based on the determined edge for the one or more items and a reference plane, a plurality of angles for the one or more items; and determine an average of the plurality of angles for the one or more items based on the determined plurality of angles for the one or more items.

In some aspects, the techniques described herein relate to a system, wherein the item righting detection device further includes: a marker affixed such that the item righting detection device field of view encompasses the one or more items and the marker.

In some aspects, the techniques described herein relate to a system, wherein the controller is further configured to: generate an image of the one or more items in response to receiving from the item righting detection device, the characteristic associated with at least one item; process the image to determine an edge for at least one of the one or more items; determine an offset angle of the item righting detection device with respect to a reference plane, the offset angle determined based on one or more characteristics of the marker included in the image; estimate a plurality of angles for the one or more items based on the processed image, the offset angle, and the edge for the one or more items; and based on the plurality of angles for the one or more items, determine an average angle, wherein the average angle is an average of the plurality of angles for the one or more items.

In some aspects, the techniques described herein relate to a system, wherein the controller is further configured to: compare the determined angle of the at least one item to a threshold, wherein if the determined angle is within the threshold, move the plurality of fingers such that the one or more items are transferred in a predetermined sequence to an output location, and wherein if the determined angle is outside the threshold, initiate a sequence of steps such that the plurality of fingers compress the items.

In some aspects, the techniques described herein relate to a system, wherein at least a subset of the plurality of fingers are configured to retract from an extended position beyond the platform to a lowered position below the platform, the lowered position permitting items to slide along the platform over the subset of the plurality of fingers.

In some aspects, the techniques described herein relate to a system, the controller further configured to: compare the determined angle of the at least one item to a threshold, wherein if the determined angle is within the threshold, move the plurality of fingers such that the one or more items are transferred in a predetermined sequence to an output location, and wherein if the determined angle is outside the threshold, initiate a sequence of steps by retracting, extending, and sliding the plurality of fingers, such that the plurality of fingers compress the items.

In some aspects, the techniques described herein relate to a method for optimizing a transfer of items, the method including, by an automated process: receiving one or more items at a first assembly within a content transfer system; receive, from one or more sensors, a characteristic associated with at least one item at the first assembly; based on the received characteristic associated with the at least one item, determine a first distance between a plurality of first fingers; move the plurality of first fingers based on the determined first distance; based on the received characteristic associated with at least one item, determine a second distance between a plurality of second fingers; move the plurality of second fingers based on the determined second distance; and rotate the first assembly and the second assembly, to translate the first and the second assembly in a predetermined sequence to transfer the one or more items to an output location.

BRIEF DESCRIPTION OF THE DRAWINGS

The foregoing and other features of the disclosure will become more fully apparent form the following description and appended claims, taken in conjunction with the accompanying drawings.

DETAILED DESCRIPTION

Figure 1:
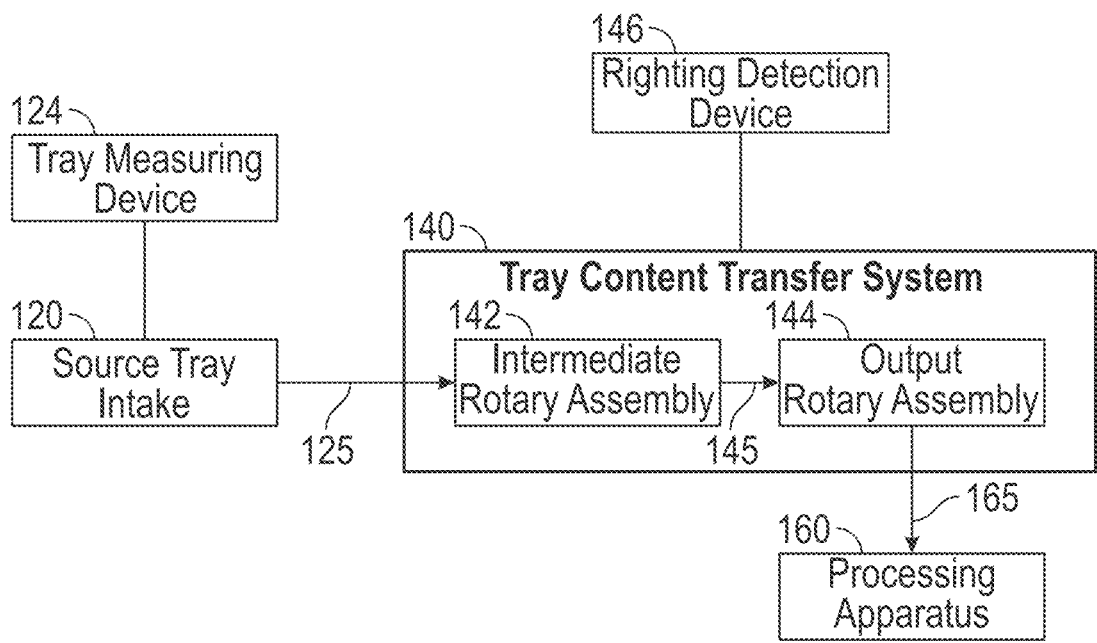
FIG. 1 illustrates an example item processing system including a tray measuring device and a righting detection device.

In the following detailed description, reference is made to the accompanying drawings. In the drawings, similar symbols typically identifying similar components, unless context dictates otherwise. Thus, in some embodiments, part numbers may be used for similar components in multiple figures, or part numbers may vary from figure to figure. The illustrative embodiments described herein are not meant to be limiting. Other embodiments may be utilized, and other changes may be made, without departing from the spirit or scope of the subject matter presented. It will be readily understood that the aspects of the present disclosure and illustrations in the figures can be arranged, substituted, combined, and designed in a wide variety of different configurations by a person of ordinary skill in the art, all of which are made part of this disclosure.

Reference in the specification to "one embodiment," "an embodiment", or "in some embodiments" means that a particular feature, structure, or characteristic described in connection with the embodiment is included in at least one embodiment of the invention. Moreover, the appearance of these or similar phrases throughout the specification does not necessarily mean that these phrases all refer to the same embodiment, nor are separate or alternative embodiments necessarily mutually exclusive. Various features are described herein which may be exhibited by some embodiments and not by others. Similarly, various requirements are described which may be requirements for some embodiments but may not be requirements for other embodiments.

In processing items in a distribution network, items can be transported in containers, such as bins, sacks, and trays. Items such as letters, postcards, envelopes, flats, or other types of stackable items may be received, transported, and processed in trays. When items are transported (e.g., between facilities or within a facility), they may be transported in trays, for example, as a stack of items within the tray. The trays may be optimized for transport of items outside of a processing facility (e.g., may be flexible, lightweight, inexpensive to manufacture, sized and shaped to fit in an item collection system, or the like), such as on an aircraft, a truck, or other vehicle. However, some trays, such as soft-sided trays may be unsuitable or unnecessary for automated or machine processing of the items within a facility. For example, the items generally must be removed from the tray for processes such as sorting, facing, cancelling, or other processes. Thus, items received in a tray may need to be removed from the tray and transferred to one or more components or sections of an item processing system. For example, items may need to be transferred to an intake portion of item processing equipment, such as a shelf and/or jogger which receives and aligns the items for processing by sorting equipment or the like.

Transferring items out of trays and into another item processing apparatus can be performed manually. Manual transfer of items from a tray to an item processing apparatus can be time-consuming and imprecise. Items may be dropped while being manually transferred, for example, while an operator is moving a stack of letters by exerting an inward pressure on the ends of the stack. In another example, items such as letters may be received in a uniformly faced arrangement, and operator error during transfer may cause some of the letters to face the opposite direction after transfer, resulting in processing errors or delays.

The item processing system disclosed herein provides improved efficiency in the automated process for transferring items or stacks of items out of a tray. In some embodiments, the item processing system may transfer items more reliably, efficiently, cost-effectively, and/or quickly than existing manual methods of item processing. Although the present disclosure describes an item processing system in the context of trays and flat items such as letter mail, it will be understood that other containers and items can be used without departing from the scope of the present disclosure.

Generally, embodiments of the systems described herein use a sequence of motions to more reliably detect, measure, and transfer items from a tray, such as a corrugated plastic tray, a letter tray, or other type of tray, to an item processing system. For example, the items may be transferred from a letter tray to a machine such as a sorter, a jogger, a shelf, or the like. A loaded tray is placed onto a source tray assembly which is located proximate to tray content transfer system and an item processing apparatus. A tray measuring device detects the presence of a tray at the source tray assembly and estimates the quantity of items and/or measures the length of a stack of items within the tray. The tray intermediate rotary assembly moves to a position above or partially within the loaded tray and adjusts components of the intermediate rotary assembly such as fingers or paddles to efficiently transfer items from the source tray assembly to the intermediate rotary assembly. The fingers or paddles can be moved or adjusted based on the quantity and/or length of items in the tray. The source tray assembly and the intermediate rotary assembly rotate together such that the tray is disposed above the intermediate rotary assembly, transferring the items onto the intermediate rotary assembly. The intermediate rotary assembly is moved away from the tray to a location where a righting detection device may measure the angle of the stack of items between the fingers of the intermediate rotary assembly and, if the angle measurement is not within a tolerance (interchangeably called a "threshold"), execute compression cycles of the items to correct the "rightness" of the stack of items.

An output rotary assembly can be positioned above items on the intermediate rotary assembly. The items may be rotationally transferred to the output rotary assembly, where a righting detection device may execute another measurement and compression cycle. After the stack is "righted" the output rotary assembly can transfer the items to a processing apparatus. The transfer sequences disclosed herein can allow the transfer system to move articles such as letters, flats, parcels, and the like. In some embodiments, the system described herein can advantageously move items from a tray to an item processing apparatus without lifting or suspending the articles over a space, gap, or area between the tray and the item processing apparatus, where articles may be lost or damaged if dropped.

When items are not properly righted in mail processing equipment, items have a higher probability of becoming dislodged, falling out, missing scans, and the like during transfer from one piece of equipment to another. Further, items may become bent or damaged if the stack of mail is not properly righted during transfer of a stack of items from one piece of mail processing equipment to another. Such problems can reduce the total throughput of items during mail processing, require operator intervention potentially leading to an increase in safety related interactions between operators and machines, and/or add an additional financial burden to the processing of items due to an increased frequency of process stop/starts. Additionally, in some item transfer processes, a step requires an operator to manually place items in a stack such that a subsequent automated process can transfer the stack of items to a sorting machine. Determining the rightness of a stack of items at various steps of the mail processing equipment's automated process advantageously reduces the frequency of failures identified above.

When a stack of items within a tray enter certain types of mail processing equipment, items can be rotatably transferred from one location to another by a mechanical means of compressing the stack of items between two slidable paddles and/or fingers as described herein. The quantity of items or the size of a stack of items within a given tray can vary depending on the quantity of items an operator chooses to place in a tray, and/or depending on the type of tray used with the mail processing equipment. Variations in the tray and quantity of items within a tray can cause variations in the best or necessary position for the paddle and/or fingers. For example, in some instances when a stack of items is small relative to the tray size, items can become dislodged from the stack or damaged during a rotatable transfer. Additionally, if an amount of items in a tray is large in relation to the tray size, the paddles may not be at the optimized position to capture all of the stack of items during a rotational transfer, resulting in items falling out of the mail processing equipment's automated system. Advantageously, prior to rotatably transferring items within a tray, it is desirable to adjust the spacing (e.g., distance) between the paddles and/or fingers such that there is an increased probability that items will remain as a single stack during a rotational transfer. Further, ascertaining a measurement of the quantity of items and/or the length of items within a tray can be used by the mail processing equipment to automatically determine and move the paddles and/or fingers such that when the mail processing equipment initiates a rotatable transfer of items from a tray, the items remain organized in a stack.

FIG. 1 schematically illustrates an example of an item processing system. The item processing system 100 includes a source tray intake 120, a tray measuring device 124, a tray content transfer system 140, an item righting detection device 146, and a processing apparatus 160. The tray content transfer system 140 comprises an intermediate rotary assembly 142 and an output rotary assembly 144. Items are transferred through the components of the item processing system 100 via several flow paths. The flow paths include the intake flow path 125, the transitional flow path 145, and the output flow path 165. Each of the flow paths 125, 145, and 165 can be any apparatus configured to move items laterally and/or vertically such as a moving conveyor belt surface, a series of rollers, or a horizontal sloped surface such as a shelf.

The source tray intake 120 can include one or more devices or systems for providing item-containing trays. For example, the source tray intake 120 can include a loading dock where item-containing trays are received from transport vehicles for processing. In some embodiments, the source tray intake 120 can be an output of another process of the item processing equipment, to be performed before the contents of a tray are transferred to a next process. For example, in some item processing embodiments, the source tray intake 120 includes a facer-canceler system configured to apply a cancellation mark to letters and place the letters in a uniformly faced stack within the source trays. In some embodiments, the mail or item processing equipment can be a delivery barcode sorter, or other automated sorting or processing apparatus. In some embodiments described herein, the tray intake 120 is a loading shelf in an item processing apparatus for the transferring of contents of a first tray to a second, automation compatible tray.

The tray measuring device 124 can include one or more devices or systems for determining the presence or absence of a tray at a given location and/or determine the a parameter of the items within a tray, such as item quantity, a length of a stack of items within a tray, a height of items within the tray, and the like. The tray measuring device 124 may include any number of machines, sensors, instrumentation, controllers, and the like, configured to detect the presence of a tray on the source tray intake 120. For example, the tray measuring device 124 can be any one or a combination of digital cameras, lidar detection devices, scanners, lasers, and/or radar devices. In some embodiments, the tray measuring device 124 is configured to detect trays comprised of a corrugated plastic postal letter trays for the transportation of items. The tray measuring device 124 can detect various types of item trays including USPS postal trays with size designations: MM, EMM, ½ MM. Further, the tray measuring device 124 may detect the lack of a tray at a given position in the item processing equipment. In some embodiments, the tray measuring device may, after detecting the type of tray, approximate the quantity of items existing within the tray and/or the size of a stack of items in the tray.

The tray content transfer system 140 generally includes one or more devices or systems for processing item-containing trays. The tray content transfer system 140 can be an automated process, or a semi-automated process with manual intervention by an operator, where a predetermined sequence of steps is executed to receive a tray containing on or more items, separate the items from the tray, dispose of the tray, manipulate the items such that they are uniformly faced in a horizontal stack, transfer the items through various assemblies within the tray content transfer system 140, and dispose the items at the processing apparatus 160. In some embodiments, the tray content transfer system 140 can include an intermediate rotary assembly 142 and an output rotary assembly 144. The intermediate rotary assembly 142 and output rotary assembly 144 include various mechanical systems comprised of arms, stoppers, fingers, and actuators, along with a control system such as a central processing unit (CPU) configured to control the mechanical systems to retain items received from a tray. The relevant mechanical components and control systems of the tray content transfer system 140, the intermediate rotary assembly 142 and the output rotary assembly 144 are described in greater detail below with reference to in FIGS. 2A-B, 3A-B, & 4.

The item righting detection device 146 can include one or more devices or systems for obtaining a representation of the average angle of a stack of items with respect to a reference plane, herein called "rightness". In some embodiments, the item righting detection device 146 may include any number of machines, sensors, instrumentation, controllers, and the like configured to measure the rightness of a stack of items located in a tray positioned at the tray intake 120, at the intermediate rotary assembly 142, and/or at the output rotary assembly 144. For example, the item righting detection device 146 can be any one or a combination of digital cameras, lidar detection devices, scanners, lasers, and/or radar devices. The stack of items may be an assortment of mail, letters and/or envelopes, positioned in succession such that the edge of each letter rests on the upper surface of a platform while an adjacent edge of each item is visible to an item righting detection device 146. For example, the item righting detection device may scan variously sized pieces of mail, letters, envelopes, and the like, to determine if the stack is righted, by generating a statistical representation of the average angle of the uniformly faced horizontal stack of items with respect to a reference plane.

The processing apparatus 160 can include one or more devices or systems for processing the items after tray content transfer. For example, the processing apparatus 160 can include any number of machines, such as mail processing equipment configured to scan, image, weigh, measure, sort, order, combine, separate, analyze, or otherwise process the items. In some item processing embodiments, the processing apparatus 160 can include one or more machines for automatically reading information provided on the letters (e.g., postage information, destination address, return address, etc.) and/or sorting the letters for further transportation according to item type and/or destination, or other criteria, such as delivery barcode systems (DBS). In some letter mail processing embodiments, the processing apparatus 160 may include a sorter/sequencer system configured to sort the letters into stop groups and sequence the letters into delivery sequence order.

The flow paths 125, 145, and 165 may be of the same type of conveying mechanism, or different conveyance mechanisms. In some embodiments the flow paths 125, 145, and 165 may be a singular conveyance mechanism or comprised of any combination of conveyance mechanisms. For example, the intake flow path 125 may be a rotary shelf, the transitional flow path 145 may be a sequence of rotational motions between two mechanical devices such as the intermediate rotary assembly 142 and the output rotary assembly 144, and the output flow path 165 may be a horizontal or sloped surface such as a shelf and one or more paddles or other movable elements configured to slide items along the horizontal or sloped surface.

In an example method of operation of the item processing system 100, an operator or an automated processing system places a tray containing a uniformly faced horizontal stack of items on the source tray intake 120. The tray measuring device 124 detects the presence of a tray at the source tray intake 120, and then measures the quantity of items and/or length of a stack of items within a tray. Items are then rotationally transferred from the source tray intake 120 to the intermediate rotary assembly 142 by an intake flow path 125. Next, the righting detection device 146 captures an image of the items at the intermediate rotary assembly 142 following the rotational transfer. The process of the righting detection device will be described with greater detail below.

The items are then rotationally transferred from the intermediate rotary assembly 142 to the output rotary assembly 144 via transitional flow path 145. Optionally, a second item righting detection device 146 may capture an image of the stack of items at the output rotary assembly 144. The stack of items is then rotationally transferred via output flow path 165 to the processing apparatus 160. Some embodiments may be configured to measure the stack of items at both the intermediate rotary assembly 142 and the output rotary assembly 144, while other embodiments may include a righting detection device 146 at the intermediate rotary assembly 142 or the output rotary assembly 144. The individual components and methods of operation will be described in greater detail below.

The example method described above with reference to FIG. 1 can be implemented on any multitude of trays at any location. For example, based on the process, a tray may be detected by the tray measuring device 124 at any predetermined location. Alternatively, more than one tray may be detectible at a given location. The presence of a tray, and the quantity of items and/or length of a stack of items within a tray may be measured at any point in the transfer process. Further, the quantity of items and/or length of a stack of items within one or more trays may be measured by one or more tray measuring device 124. In some embodiments, the item righting detection device 146 can measure a uniformly faced horizontal stack of items during any step of the item transfer process. Further, the item righting detection device 146 may measure more than one stack of items and determine the rightness of each stack independently. In an additional implementation, one or more of item righting detection device 146 may be utilized to measure one or more of a stack of items at multiple locations throughout the item transfer process.

Additionally, the method described above with reference to FIG. 1 can be implemented in any combination of devices. The tray measuring device 124 and the item righting detection device 146 may be implemented as separate and independent devices or systems. Further the tray measuring device 124 and the item righting detection device 146 may be implemented as one or more devices or systems performing any combination of tasks herein.

Figure 2A:
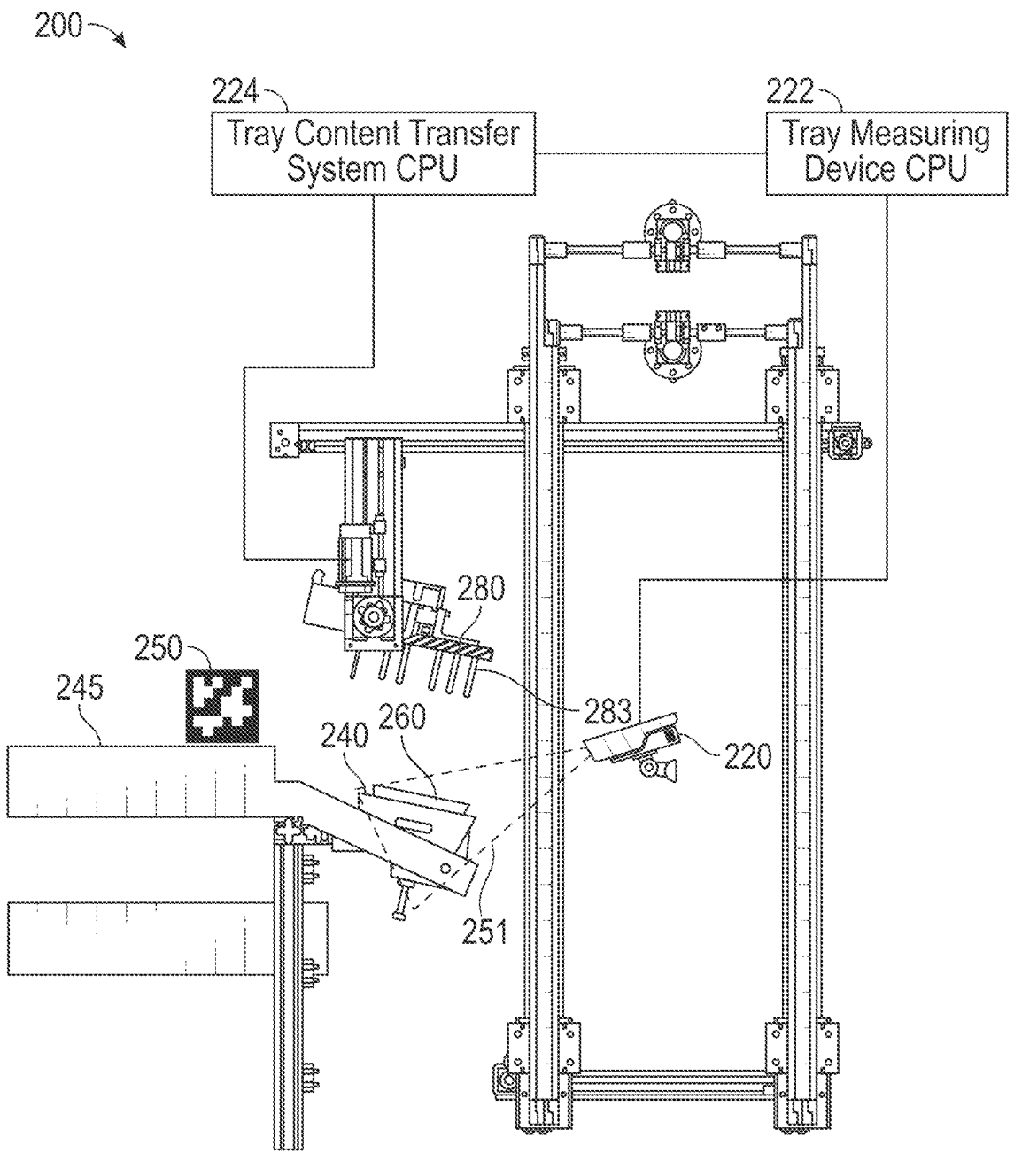
FIG. 2A is a side perspective view of an example tray measuring system and a tray content transfer system.

FIG. 2A is a side perspective view, respectively, of the tray measuring system 200 in a tray detection and tray measurement state. The tray measuring system 200 can include a tray measuring device 220, a tray 240, a tray input 245, a tray measuring reference marker 250, items 260, an intermediate rotary assembly 280, a tray measuring device CPU 222, and a tray content transfer system CPU 224. The CPUs 222 and 224 can each comprise one or more processors in connection with memory and control lines configured or programmed to perform the actions described herein.

A tray measuring device 220 may be one or more combination of instrumentation, sensor, or devices configured to detect a tray and measure the presence of items within a tray. For example, the tray measuring device 220 may be, but is not limited to, one or more of a combination of the following: inductive proximity sensors, ultrasonic proximity sensors, optical proximity sensors, radar, limit-switches, pressure-switches, load-cells, and/or an image capturing device.

The tray measuring device CPU 222 may be a computer or computing device configured to receive and process data from the tray measuring device 220 and transmit data to a tray content transfer system CPU 224. The tray measuring device CPU 222 may be a programmable logic controller (PLC) or an edge motion controller. The tray measuring device 220 communicates with a tray measuring device CPU 222.

In an example implementation, the tray measuring device 220 is an image capture device, such as a camera affixed at an appropriate position, such that the camera field of view 251 encompasses the tray input 245. Advantageously, the camera's field of view 251 encompasses a tray 240 on a tray input 245 such that the camera may detect the presence of a tray 240 positioned on the tray input 245.

The tray content transfer system CPU 224 may be a computer or computing device configured to receive tray detection and measurement data from the tray measuring device CPU 222 and control the physical movement of the tray measuring system 200. The tray content transfer system CPU 224 may be a PLC or an edge motion controller. The computing components, communication methods, and control means of the tray measuring device CPU 222 and the tray content transfer system CPU 224 will be described in further detail below with reference to FIG. 4.

The tray 240 is a container configured to hold items. The tray 240 is used for holding and transporting items 260, and may comprise a corrugated plastic or similar material. In some embodiments, the tray 240 is not configured for use in automated processing systems, and therefore, the tray contents must be transferred to another tray or to an intake of item processing equipment. In an example implementation, the tray may be of a standard size including MM tray, EMM tray, and/or ½ MM tray.

The items 260 may be at least one of mail, letters, envelopes, flats, parcels, and the like of various sizes. The items 260 may already be uniformly faced (that is, selectively flipped such that the postage and address of one or more items 260 in the stack faces the same direction). According to some embodiments, the items 260 have a minimum height of approximately 3.5 inches, a maximum height of approximately 6.125 inches, a minimum length of approximately 5 inches, and a maximum length of approximately 11.5 inches.

According to some embodiments, the tray input 245 may be a table, conveyor, and/or a shelf. The tray input 245 may be configured to support a tray 240. The tray 240 may contain some quantity of items 260. In some embodiments an operator manually places a tray 240 on the tray input 245. In some embodiments, the tray 240 may be placed or positioned on the tray input 245 by another mechanical means of conveyance such as, but not limited to a robotic conveyance system, a forklift, a dolly, a belt driven conveyor, or a line shaft conveyor. According to some embodiments, the tray input 245 operates continuously and/or intermittently.

The tray measuring reference marker 250, (hereinafter "marker 250") is a camera calibration marker. The tray measuring reference marker 250 may be a sticker or printed on a piece of paper. In an example implementation, the marker 250 is a binary square fiducial marker. The marker 250 may be affixed to any number of predetermined positions on the tray measuring system 200 such that the marker 250 is within the field of view 251 of the tray measuring device 220. For example, the marker 250 may be affixed to the tray input 245. The marker 250 may be utilized by the tray measuring device 220 to calculate an offset angle of the tray measuring device 220 with respect to a normalized plane of the tray input 245. Advantageously, incorporating a marker 250 expands the possible mounting locations for the tray measuring device 220 such that the tray detection device may be positioned in a safe location, accessible by, for example, maintenance personnel without requiring an interruption to the mail processing equipment.

Figure 2B:
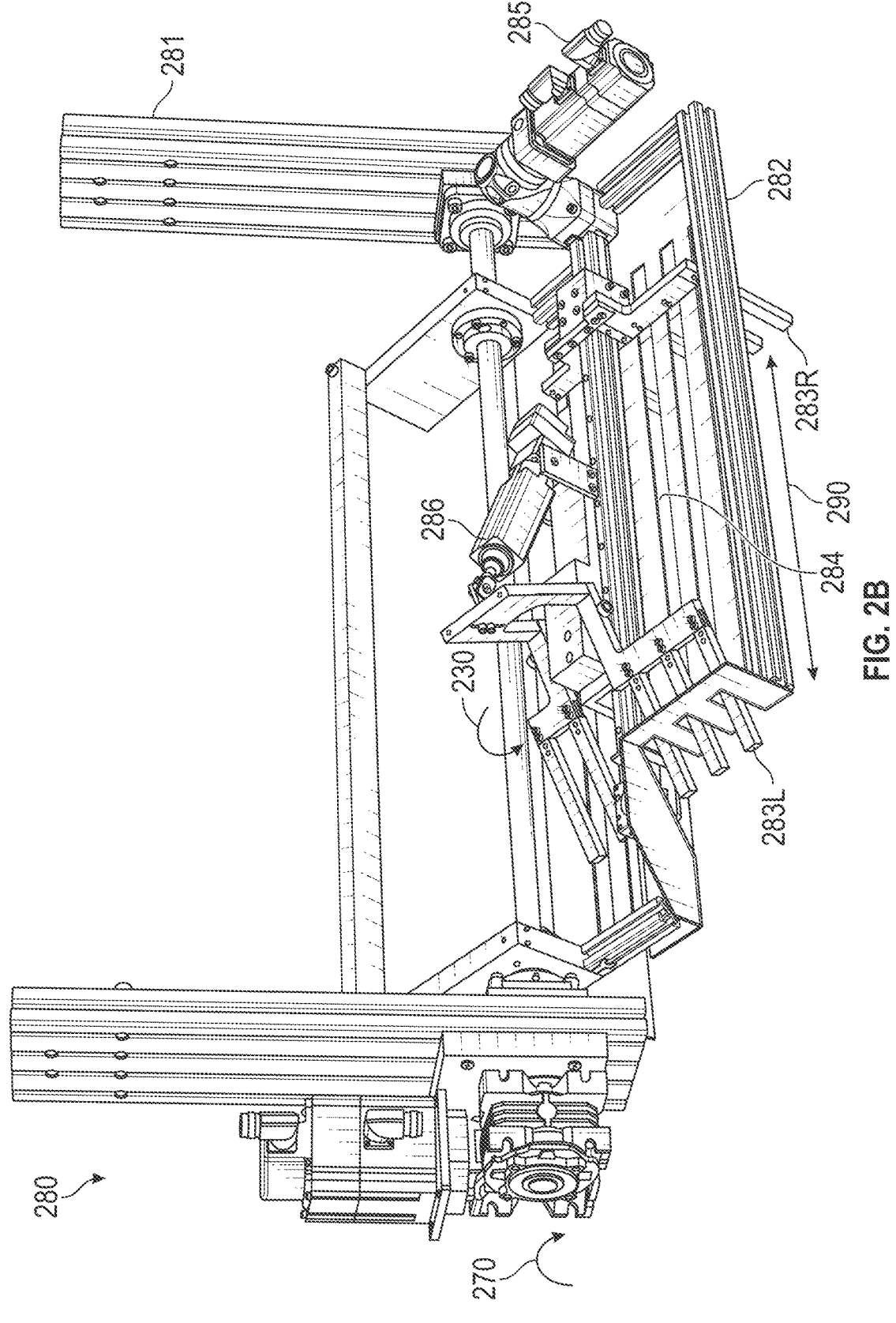
FIG. 2B is a right-side elevation view of the intermediate rotary assembly showing axes of motion and detailed components.

FIG. 2B is an enlarged perspective view depicting the intermediate rotary assembly 280 shown in FIG. 2A. The intermediate rotary assembly 280 includes arms 281, a platform 282, left fingers 283L, right fingers 283R, slots 284, an intermediate finger motor 285, and an intermediate finger actuator 286. The intermediate rotary assembly 280 is configured for translational and rotational motion to transfer items 260 from a tray 240.

The platform 282 is rotatably mounted to the arms 281 such that the platform can rotate about in a direction indicated by arrow 270. Fingers 283L and 283R are slidably mounted to the platform 282 such that fingers 283L, 283R extend through one of the corresponding slots 284 in platform 282 while remaining substantially perpendicular to the platform 282. An intermediate finger motor 285 or motors control the translational motion of the fingers 283L, 283R along the slots 284 along transitional arrow 290. Further, the intermediate finger motor 285 can precisely control the spacing between fingers 283L and 283R. The intermediate finger actuator 286 controls the angular motion of the fingers 283L and 283R as indicated by rotational arrow 230. The rotational arrow 230 can indicate motion about an axis perpendicular to the slots 284 such that the fingers 283L and 283R retract.

In an example implementation, all of fingers 283L may be movable as a single unit, and all of fingers 283R may be movable as a single unit. In some embodiments, each digit of fingers 283L and 283R can be independently movable, in linear and/or angular movement. Alternatively, either fingers 283L or 283R may be movable, while the other finger set is fixed to the platform 282. In another implementation, the fingers 283L, 283R may be of another type of item-handling mechanism such as paddles configured to slide items 260 along the platform 282, or any other mechanical means of controlling the translational motion of items 260 on a platform 282.

With reference to FIGS. 2A-2B, motion of any of the moving parts described herein, for example rotational motion in directions as indicated by arrow 230 and/or arrow 270, or horizontal translational motion along transitional arrow 290 can be driven by any number of motors, electro-mechanical or pneumatic devices, etc., and/or can be selectively controlled and/or inhibited by mechanical or electrical motors or brakes configured to start, slow, or stop and/or prevent motion along any of the movement axes described herein. The motors and/or brakes can be controlled by one or more controllers, which may include computer components such as one or more processors, memory or other storage media, network, or other communication interfaces, and/or other circuitry. In some embodiments, a memory of the controller stores computer-executable instructions that, when executed by the processor and/or other circuitry of the controller, directly or indirectly cause the motors and/or brakes to move in a predetermined sequence.

In an example implementation, the tray measuring device 220 field of view 251 encompasses a tray 240 at another location other than on a tray input 245. For example, the tray measuring device 220 be rotatably mounted to a mechanical swivel to allow the tray measuring device 220 to determine if a tray 240 is present at a previous step in the item processing system.

Figure 3A:
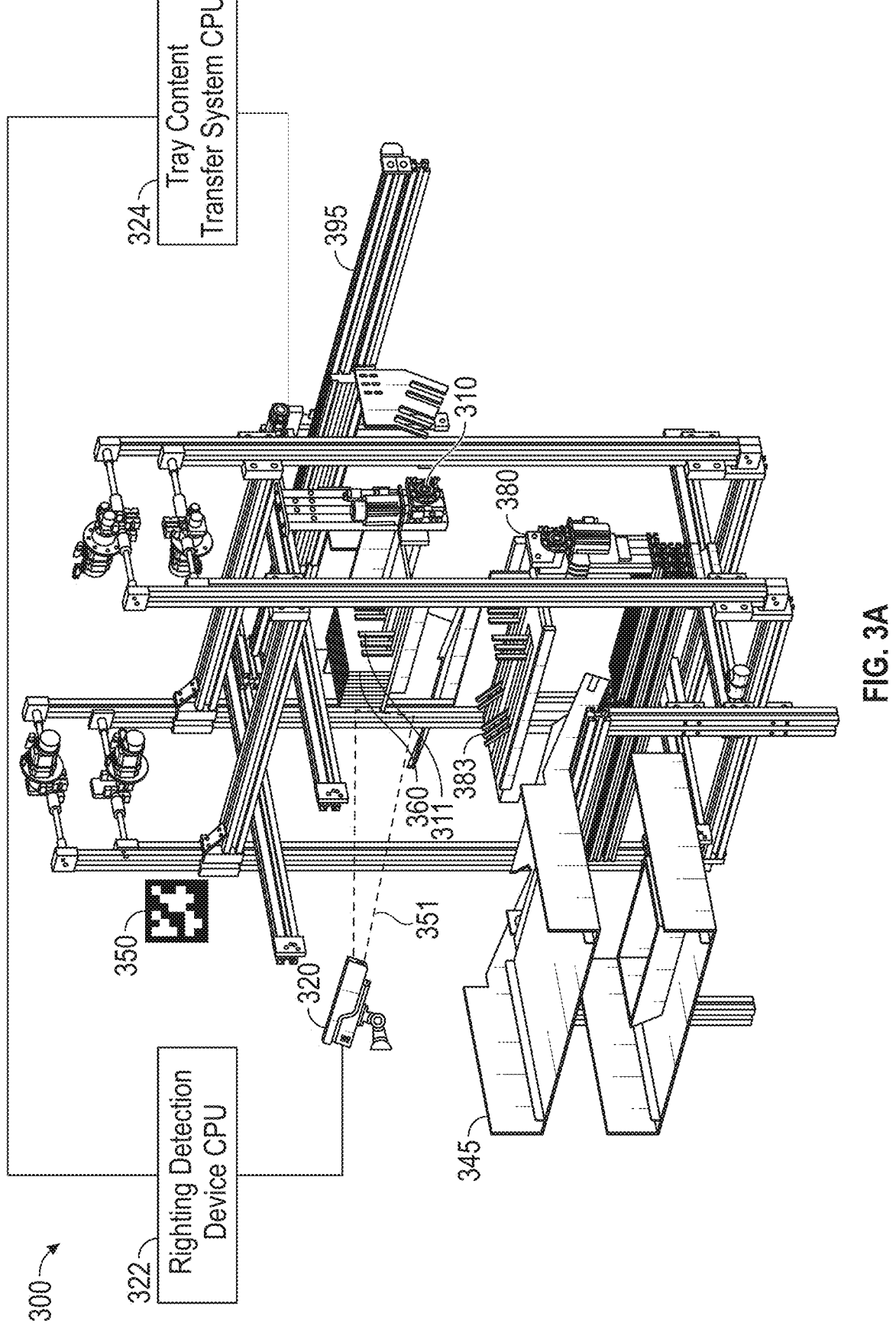
FIG. 3A is a right-side elevation view of the righting detection system.

FIG. 3A depicts a righting detection system 300 in accordance with an example embodiment. The righting detection system 300 includes a righting detection device 320, a righting detection device CPU 322, a tray content transfer system CPU 324, a tray input 345, a righting detection reference marker 350, items 360, an intermediate rotary assembly 310, an output rotary assembly 380, and a processing apparatus 395. The output rotary assembly 380 further includes arms 381, a platform 382, and fingers 383. The CPUs 322 and 324 can be similar to the CPUs described elsewhere herein, and can include one or more processors and may be in communication with one or more memories. The output rotary assembly 380 is described in greater detail below in FIG. 3B. The intermediate rotary assembly 310 can be similar to the intermediate rotary assembly described in FIGS. 2A-2B.

A righting detection device 320 may be any type and/or combination of instrumentation, sensors, or devices configured to detect a physical presence and transmit data to a righting detection device CPU 322. In some embodiments, the righting detection device 320 may be a single instrument or may comprise of multiple instruments configured to measure the edge of an item 360. For example, the righting detection device 320 may be one or more of a combination of the following: inductive proximity sensors, ultrasonic proximity sensors, optical proximity sensors, radar, limit-switches, pressure-switches, load-cells, and/or an image capturing device.

Advantageously, a righting detection system 300 can be used as part of mail (e.g., item) processing equipment to solve one or more problems occurring during a transfer of one or more items. For example, when items are not properly righted in mail processing equipment, items have a higher probability of becoming dislodged, falling out, missing scans, and/or the like, during a transfer from one piece of equipment to another. Further, items may become bent or damaged if the stack of items are not properly righted during transfer of a stack of items from one piece of mail processing equipment to another. Such problems can reduce the total throughput of items during mail processing, require operator intervention potentially leading to an increase in safety related interactions between operators and machines, and/or add an additional financial burden resulting from an increased frequency of process and/or machine stop/starts. To resolve problems associated with a stack of items, a righting detection system 300, as described herein, can determine one or more characteristics of the stack of items, and move fingers 383 (and/or fingers 283) before, and/or during a transfer. For example, if the righting detection system 300 determines that one or more items in a stack of items are laying down, while other items in the stack of items are standing straight, the righting detection system 300 can move fingers 383 about platform 382 such that the fingers 383 adjust the items (e.g., to stand up the laid-down items) to create a uniform stack.

The righting detection device 320 may be a camera affixed at an appropriate position, where the camera's field of view 351 is configured to encompass items 360 positioned between the fingers 311 of the intermediate rotary assembly 310 such that the camera field of view 351 may detect an angle of the edge of each item 360 positioned between fingers 311.

The righting detection device CPU 322 may be a computer or computing device configured to receive and process data from the righting detection device 320 and transmit data to a tray content transfer system CPU 324. The righting detection device CPU 322 may be a PLC or an edge motion controller or other similar device.

The tray content transfer system CPU 324 may be a computer or computing device configured to receive data corresponding to the angle of a stack of items 360 from the righting detection device CPU 322 and control the physical movement of the righting detection system 300. The tray content transfer system CPU 324 may be a PLC or an edge motion controller. The computing components, communication methods, and control means of the righting detection device CPU 322 and the tray content transfer system CPU 324 will be described in further detail below with reference to FIG. 4.

According to some embodiments, the tray input 345 may be a table, conveyor, and/or a shelf similar to the tray input 245 as previously described elsewhere herein.

The righting detection reference marker 350 may be a camera calibration marker. The righting detection reference marker 350 may be a sticker or printed on a piece of paper. In some embodiments, a righting detection reference marker 350 is a binary square fiducial marker. The righting detection reference marker 350 may be affixed to any number of predetermined positions on a righting detection system 300 such that the righting detection reference marker 350 is within a field of view 351 of a righting detection device 320.

In some embodiments, the righting detection reference marker 350 is affixed to the output rotary assembly 380 when the righting detection device 320 field of view 351 encompasses the output rotary assembly 380. The righting detection reference marker 350 may be utilized by the righting detection device 320, to calculate an offset angle of the righting detection device 320 with respect to a normalized plane of the output rotary assembly 380. Advantageously, incorporating a righting detection reference marker 350 expands the possible mounting locations for the righting detection device 320 such that the righting detection device 320 may be positioned in a safe location, accessible by, for example, maintenance personnel without requiring an interruption to the mail processing equipment.

Alternatively, the righting detection reference marker 350 can be affixed to the intermediate rotary assembly 310 when the righting detection device 320 field of view 351 encompasses the intermediate rotary assembly 310. The righting detection reference marker 350 may be utilized by the righting detection device 320, to calculate an offset angle of the righting detection device 320 with respect to a normalized plane of the intermediate rotary assembly 310. In an additional implementation, the marker 250 and the righting detection reference marker 350 may be the same marker positioned such that the marker is in the field of view 251 and/or 351 of one or more of the tray measuring device 220 and/or the righting detection device 320.

The processing apparatus 395 can include one or more devices or systems for processing the items 360 after transfer from the output rotary assembly 380. For example, the processing apparatus 395 can include any number of machines, such as mail processing equipment, configured to scan, image, weigh, measure, sort, order, combine, separate, analyze, or otherwise process the items 360. In some item processing embodiments, the processing apparatus 395 can include one or more machines for automatically reading information provided on the letters (e.g., postage information, destination address, return address, etc.) and/or sorting the letters for further transportation according to item type and/or destination, or other criteria. In some letter mail processing embodiments, the processing apparatus 395 may include a sorter/sequencer system configured to sort and sequence the letters.

Figure 3B:
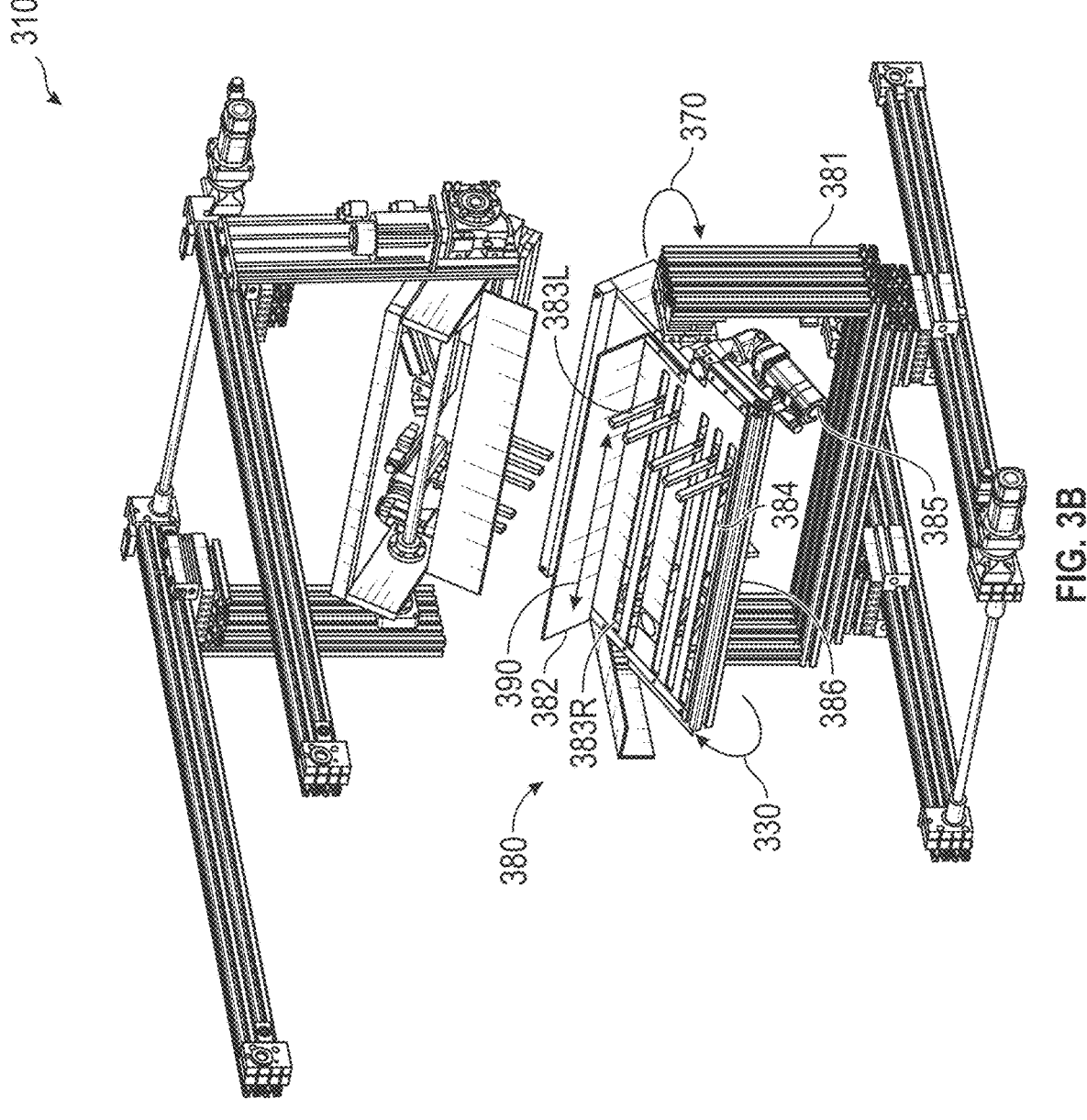
FIG. 3B is a right-side elevation view of the intermediate rotary assembly and output rotary assembly showing axes of motion and detailed components.

FIG. 3B is an enlarged perspective view depicting the intermediate rotary assembly 310 and the output rotary assembly 380 shown in FIG. 3A. The output rotary assembly

380 includes arms 381, a platform 382, left fingers 383L, right fingers 383R, slots 384, an output finger motor 385, and an output finger actuator 386. The output rotary assembly 380 is configured for translational and rotational motion to transfer items 360 from the intermediate rotary assembly 310 to the processing apparatus 395.

The platform 382 is rotatably mounted to the arms 381 in direction of arrow 370. Fingers 383L and 383R are slidably mounted to the platform 382 such that fingers 383L, 383R extend through one of the corresponding slots 384 in platform 382 while remaining substantially perpendicular to the platform 382. An output finger motor 385 or motors control the translational motion of the fingers 383L, 383R along the slots 384 as indicated by transitional arrow 390. Further, the output finger motor 385 may be configured to precisely control the spacing between fingers 383L and 383R. An actuator 386 controls the angular motion of the fingers 383L and 383R as indicated by rotational arrow 330, about a rotational axis perpendicular to the slots 384 such that the fingers 383L and 383R retract.

In another implementation, all of fingers 383L may be movable as a single unit, and all of fingers 383R may be movable as a single unit. For example, the fingers 383L and 383R may be independently movable, in linear and/or angular movement. Alternatively, either fingers 383L or 383R may be movable, while the other finger set is fixed to the output rotary assembly 380. In another implementation, the fingers 383L, 383R may be of another type of item handling mechanism such as paddles configured to slide items along a platform, or any other mechanical means of controlling the translational motion of items on a platform 382.

With reference to FIGS. 3A-3B, motion of any of the moving parts described herein, for example rotational motion in directions as indicated by arrow 330 and/or arrow 370, or horizontal translational motion along transitional arrow 390 can be driven by for example, any combination of mechanical means including, for example: electrical motors, electromechanical actuators, pneumatic devices, and/or hydraulic systems. The mechanical means can be selectively controlled and/or inhibited by, for example, mechanical pneumatic brakes configured to stop and/or prevent motion along any of the movement axes described herein. Motors and/or brakes can be controlled by one or more controllers, which may include computer components such as one or more processors, memory or other storage media, network or other communication interfaces, and/or other circuitry. In some embodiments, a memory of the controller stores computer-executable instructions that, when executed by the processor and/or other circuitry of the controller, directly or indirectly cause the motors and/or brakes to move in a predetermined sequence.

Figure 4:
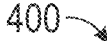
FIG. 4 is a block diagram of an item processing system.
Figure 4:
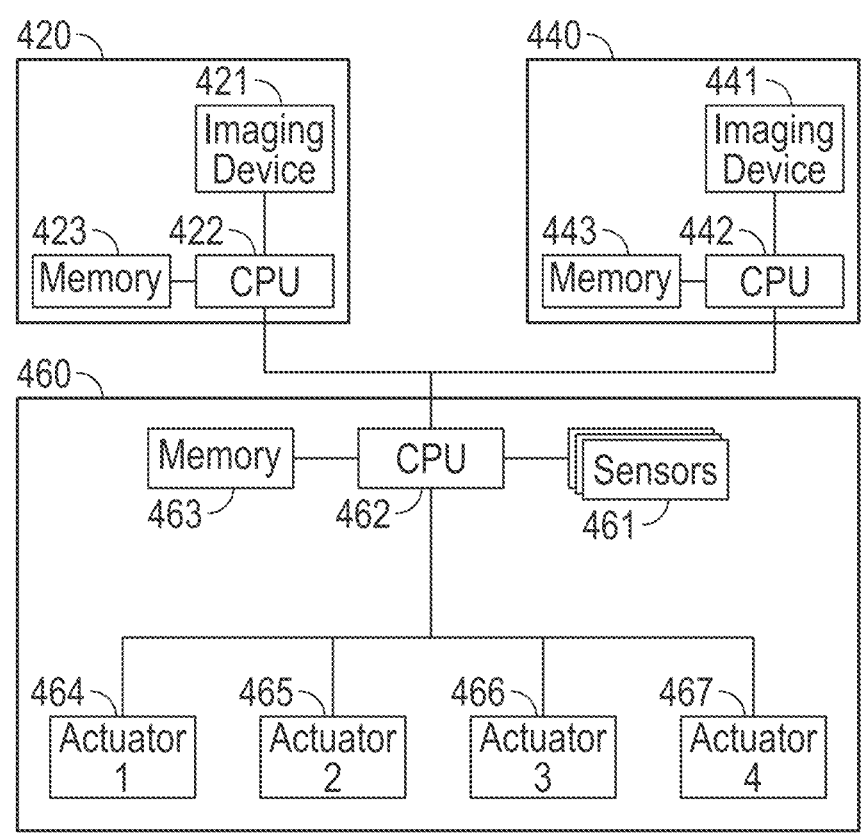

FIG. 4 is a block diagram of an item processing system 400 in accordance with an example embodiment. The item processing system 400 includes a tray measuring device 420, an item righting detection device 440, and a tray content transfer system 460.

The tray measuring device 420 includes an imaging device 421, a CPU 422, and memory 423. The imaging device 421 is in communication with the CPU 422. The CPU 422 is in further communication with memory 423 and the tray content transfer system 460. The CPU 422 can be similar to the tray measuring device CPU 222 as described above in FIG. 2A.

The imaging device 421 is configured to transmit to the CPU 422 data corresponding to an image of the tray input 245, and receive, from the CPU 422 data corresponding to, but not limited to, modes of operation and/or calibration data. Modes of operation may include Power ON, Power OFF, scan an image, and send scanned image data to the CPU. Calibration data may include image focus data, image filter data, and shutter speed setpoint data.

The CPU 422 is configured to receive from the imaging device 421, data corresponding to an image of the tray input 245. The CPU 422 is further configured to transmit to memory 423 data corresponding to the image received by the imaging device 421. Additionally, the CPU 422 is configured to transmit to the tray content transfer system 460, data corresponding to the detection of a tray and an approximation of a quantity of items and/or length of a stack of items within a tray 240 such that the tray content transfer system 460 may adjust the angular and linear positions of the fingers 283L, 283R of the intermediate rotary assembly 280 in order for items to be rotationally transferred in an organized horizontal stack from the tray input 245 to the intermediate rotary assembly 280.

The memory 423 is configured to store data received from the CPU 422 and send data stored therein to the CPU 422. Examples of data that may be received and stored in the memory 423 include data received at the CPU 422 from the imaging device 421, data received at the CPU 422 from the tray content transfer system 460, and one or more computer-executable instructions. An example of a computer-executable instruction that may be stored in memory 423 and executed by the CPU 422 include instructions causing the CPU 422 to selectively activate and/or deactivate the imaging device 421 in a predetermined mode of operation, such that the imaging device 421 captures an image of items within a tray 240 located at the tray input 245. Another example of computer-executable instructions stored in memory 423 and executed by the CPU 422 include instructions causing the CPU 422 to request image data from the imaging device 421, where the CPU 422 further processes the image to determine whether a tray 240 exists at the tray input 245, determining a type of tray 240 at the tray input 245, and approximating a quantity of items 260 and/or length of a stack of items 260 within a tray 240.

The item righting detection device 440 includes an imaging device 441, a CPU 442, and memory 443. The imaging device 441 is in communication with the CPU 442. The CPU 442 is in further communication with memory 443 and the tray content transfer system 460. The CPU 442 can be similar to the righting detection device CPU 322 described above in FIG. 3A.

The imaging device 441 is configured to transmit to the CPU 442 data corresponding to an image of a horizontal stack of items located at the intermediate rotary assembly 280. The imaging device 441 is further configured to receive, from the CPU 442 data corresponding to, but not limited to, modes of operation and/or calibration data. Modes of operation may include Power ON, Power OFF, scan an image, and send scanned image data to the CPU 442. Calibration data may include image focus data, image filter data, and shutter speed setpoint data. In another example implementation, the imaging device 441 is configured to transmit to the CPU 442 data corresponding to an image of the horizontal stack of items located at the output rotary assembly 380.

The CPU 442 is configured to receive from the imaging device 441, data corresponding to an image of the intermediate rotary assembly 280. The CPU 442 is further configured to transmit to memory 443, data corresponding to the image received by the imaging device 441. Additionally, the CPU 442 is configured to transmit to the tray content transfer system 460, data corresponding to the rightness of a stack of items such that the tray content transfer system 460 may adjust the angular and linear positions of the fingers 283L, 283R of the intermediate rotary assembly 280 to correct the rightness of the corresponding horizontal stack of items. Alternatively, the CPU 442 can be configured to receive from the imaging device 441, data corresponding to an image of the output rotary assembly 380. In another embodiment, the data transmitted by the CPU 442 to the tray content transfer system 460 causes the tray content transfer system 460 to adjust the fingers 383L, 383R of the output rotary assembly 380.

Advantageously, CPU 442 and/or 462 can be used as part of mail (e.g., item) processing equipment to solve one or more problems occurring during a transfer of one or more items. For example, when items are not properly righted in mail processing equipment, items have a higher probability of becoming dislodged, falling out, missing scans, and/or the like, during a transfer from one piece of equipment to another. Further, items may become bent or damaged if the stack of items are not properly righted during transfer of the stack of items from one piece of mail processing equipment to another. Such problems can reduce the total throughput of items during mail processing, require operator intervention potentially leading to an increase in safety related interactions between operators and machines, and/or add an additional financial burden resulting from an increased frequency of process and/or machine stop/starts. To resolve these problems associated with a stack of items, CPU 442 and/or 462, as described herein, can determine one or more characteristics of the stack of items, and move fingers 283 and/or 383 before and/or during a transfer. For example, if the CPU 442 determines that one or more items in a stack of items are laying down, while other items in the stack of items are standing straight, the righting detection system 300 can move fingers 383 about platform 382 such that the fingers 383 adjust the items (e.g., stand up the laid-down items) to create a uniform stack.

The memory 443 is configured to store data received from the CPU 442 and send data stored therein to the CPU 442. Examples of data that may be received and stored in the memory 443 include data received at the CPU 442 from the imaging device 441, data received at the CPU 442 from the tray content transfer system 460, and one or more computer-executable instructions. An example of a computer-executable instruction that may be stored in memory 443 and executed by the CPU 442 include instructions causing the CPU 442 to selectively activate and/or deactivate the imaging device 441 in a predetermined mode of operation, such that the imaging device 441 captures an image of items at the intermediate rotary assembly 280. Another example of computer-executable instructions stored in memory 443 and executed by the CPU 442 include instructions causing the CPU 442 to process an image received from the imaging device 441 and determine a statistical representation of the average angle of a uniformly faced horizontal stack of items with respect to a reference plane of the intermediate rotary assembly 280.

Alternatively, the computer-executable instructions that may be stored in memory 443 and executed by the CPU 442 include instructions causing the CPU 442 to selectively activate and/or deactivate the imaging device 441 in a predetermined mode of operation, such that the imaging device 441 captures an image of items at the output rotary assembly 380. Another example of computer-executable instructions stored in memory 443 and executed by the CPU 442 include instructions causing the CPU 442 to process an image received from the imaging device 441 and determine a statistical representation of the average angle of a uniformly faced horizontal stack of items with respect to a reference plane of the output rotary assembly 380.

The tray content transfer system 460 includes one or more sensors 461, a CPU 462, memory 463, and actuators 464, 465, 466, and 467. The one or more sensors 461 are in communication with the CPU 462. The CPU 462 is in further communication with memory 463, the tray measuring device 420, the item righting detection device 440, and actuators including actuator 464, actuator 465, actuator 466, and actuator 467. Although the tray content transfer system is depicted as having four actuators, the number of actuators in various embodiments can be greater or smaller than four, for example, based on the number of parts to be moved in any embodiment of the tray content transfer system 460. CPU 462 can be similar to the tray content transfer system CPU 224 as described above in FIG. 2A and/or the tray content transfer system CPU 324 as described above in FIG. 3A.

The tray content transfer system 460 includes one or more sensors 461 configured to determine a status of one or more components of the tray content transfer system 460. For example, the sensors 461 can include a sensor configured to detect the presence of a tray 240 before initiating a transfer process (e.g., a light gate or photoelectric sensor disposed to be triggered when a tray 240 is present on the tray input 245. The sensors 461 can include one or more proximity sensors, profile sensors, pressure sensors, force sensors, scales, cameras, optical pattern recognition devices such as barcode scanners, light gates, or the like. In some embodiments, the sensors 461 can include a manually activated device, such as a button, configured to produce a signal indicating that a tray 240 has been loaded into the tray content transfer system 460.

In another example, the sensors 461 can include a force sensor disposed on left fingers 283L and/or right fingers 283R of the intermediate rotary assembly 280 and configured to transmit a signal when a threshold force is detected, indicating that the left and right fingers 283L, 283R have surrounded and suitably compressed the stack of items. The CPU 462 may then cause an indicator of the spacing between fingers 283L and 283R to be stored in the memory 463 to subsequently set the spacing of the fingers 383L and 383R of the output rotary assembly 380 in order to facilitate smooth transfer of items from the intermediate rotary assembly 280 to the output rotary assembly 380 and from the output rotary assembly 380 to the processing apparatus 395.

The CPU 462 is configured to communicate with the tray measuring device 420, the item righting detection device 440, the sensors 461, the memory 463, and the actuators 464, 465, 466, and 467. The CPU 462 receives data from the tray measuring device 420 corresponding to, for example, an approximation of the quantity of items and/or length of a stack of items in a tray. Data transmitted to or received from the tray measuring device 420 and the CPU 462 may further include tray measurement initial settings, device status, event log information, and Power ON/Power OFF commands. In one implementation, the CPU 462 is configured to receive from the tray measuring device 420, computer-executable instructions such that the CPU 462 may adjust the angular and linear positions of the fingers 283L, 283R of the intermediate rotary assembly 280, in order for items to be rotationally transferred, as an organized horizontal stack, from the tray input 245 to the intermediate rotary assembly 280.

The CPU 462 may be further configured to receive from the item righting detection device 440, data corresponding to, for example, a statistical representation of the average angle of a stack of items. Data transmitted to or received from the item righting detection device 440 and the CPU 462 may further include, for example, computer-executable instructions such as initial settings for the item righting detection device 440, requests for device status, requests for event log information, and Power ON/Power OFF commands. In one implementation, the CPU 462 is configured to receive from the item righting detection device 440, computer-executable instructions such that the CPU 462 may adjust the angular and linear positions of the fingers 283L, 283R of the intermediate rotary assembly 280 to correct the rightness of the corresponding horizontal stack of items 260. In another implementation, the CPU 462 is configured to receive from the item righting detection device 440, computer-executable instructions such that the CPU 462 may adjust the angular and linear positions of the fingers 383L, 383R of the output rotary assembly 380 to correct the rightness of the corresponding horizontal stack of items 360.

The CPU 462 is further configured to control and receive input from the sensors 461. The CPU 462 is configured to receive a status of one or more sensors 461 of the tray content transfer system 460 as illustrated above in order to facilitate smooth transfer of items from the tray input 245 to the intermediate rotary assembly 280, then to the output rotary assembly 380 and last to the processing apparatus 395.

Additionally, the CPU 462 controls actuators 464, 465, 466, and 467. The CPU 462 may selectively activate and/or deactivate the actuators 464, 465, 466, and 467 in a predetermined sequence to transfer items from a tray. In another embodiment, the CPU 462 may activate and deactivate the actuators 464, 465, 466, and 467 in a predetermined sequence to "right" a stack of items.

The memory 463 is configured to store data received from the CPU 462 and send data stored therein to the CPU 462. Examples of information that may be received by the CPU 462 and stored in the memory 463 or sent to the CPU 462 from memory 463 include, for example, information from the tray measuring device 420, information from the item righting detection device 440, information from the sensors 461, information from the actuators 464, 465, 466, 467. Additionally, the memory 463 may store and transmit, to the CPU 462 one or more computer-executable instructions that, when executed by the CPU 462, cause the CPU 462 to selectively activate and/or deactivate the actuators 464, 465, 466, and 467.

The actuators 464, 465, 466, and 467, are controllable actuators each coupled to and configured to move fingers 283L, 283R of the intermediate rotary assembly 280. Each actuator 464, 465, 466, and 467, can include one or more electric motors, hydraulic cylinders, pneumatic actuators, screw jacks, servos, solenoids, or the like. In one example implementation of the tray content transfer system 460 as illustrated in FIGS. 2A-2B and/or 3A-3B, the actuators may be arranged such that, for example, actuator 464 corresponds to the intermediate finger motor 285, actuator 465 corresponds to the intermediate finger actuator 286, actuator 466 corresponds to the output finger motor 385, and actuator 467 corresponds to the output finger actuator 386. Advantageously, actuators 464, 465, 466, and/or 467 are used as part of mail (e.g., item) processing equipment to solve one or more problems occurring during a transfer of one or more items. For example, the actuators can move fingers 283 and/or 383 to properly right in mail processing equipment. When items are properly righted, the items are less likely to become dislodged, bent, lost, and/or damaged during a transfer from one piece of equipment to another. Such problems can reduce the total throughput of items during mail processing, require operator intervention potentially leading to an increase in safety related interactions between operators and machines, and/or add an additional financial burden resulting from an increased frequency of process and/or machine stop/starts.

Additionally, the functions of CPU 422, 442, and 462 may be combined into one CPU or any number thereof. Further, the functions of memory 423, 443, and 463 may be a combined into a single memory configured to communicate with a one or more CPUs. The imaging device 421 and imaging device 441 may be one in the same device configured to capture an image of a tray 240 at the tray input 245 and capture an image of the angle of a uniformly faced horizontal stack of items at the intermediate rotary assembly 280 and the output rotary assembly 380.

Figure 5:
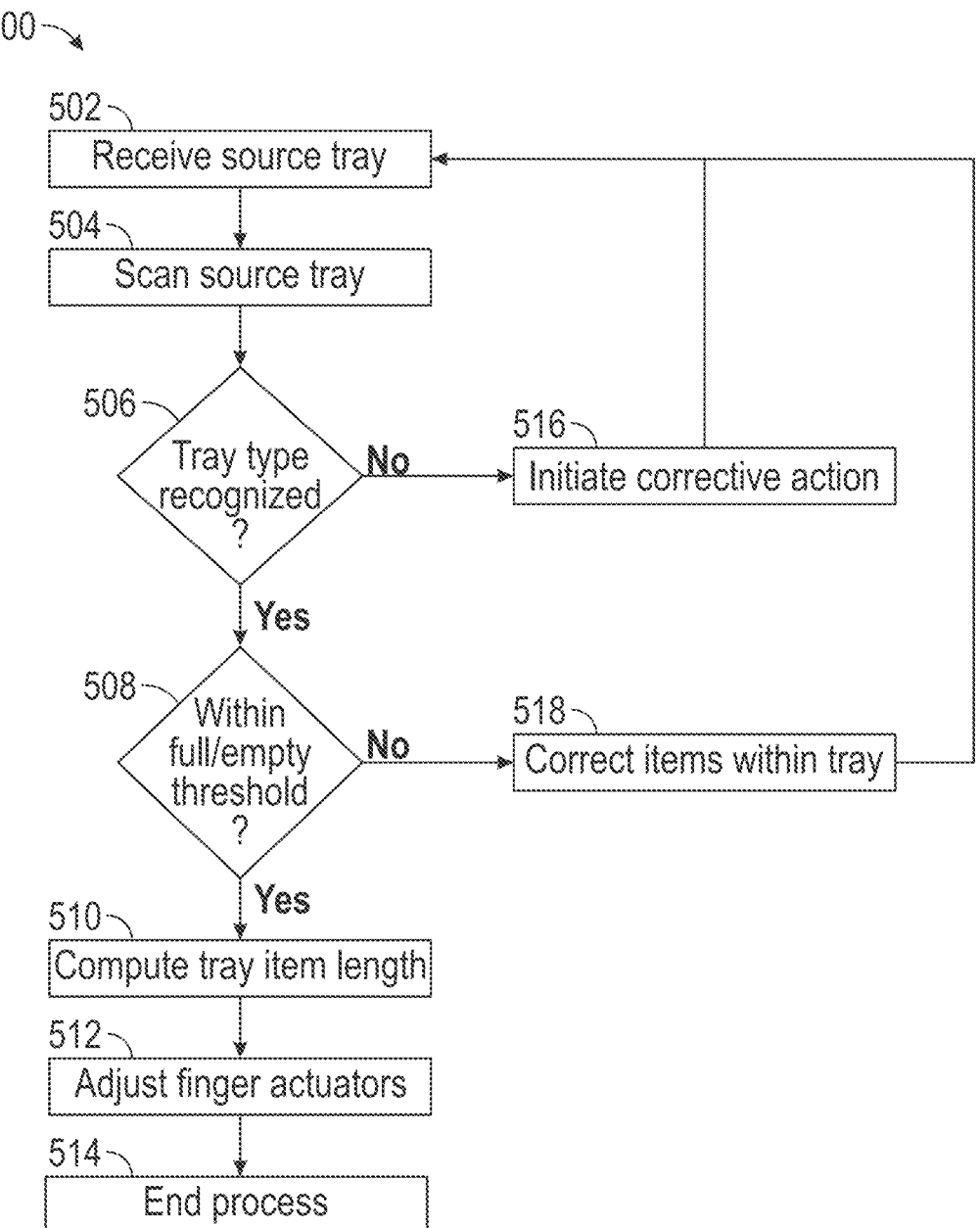
FIG. 5 is a flowchart illustrating an example method for detecting the presence of a tray and measuring the quantity of items and/or length of a stack of items within a tray in an item processing system.

FIG. 5 is a flowchart illustrating an example method 500 of measuring the quantity of items and/or length of a stack of items within a tray in the source tray intake of a mail processing equipment. The method 500 can be performed by a computer system integrated with a system such as the system 100, 200, or 400, depicted in FIGS. 1, 2 and/or 4. Although the method 500 is described with reference to the tray measuring system 200, the method 500 may be performed within any of the processing systems described herein. For example, a tray 240 may be detected at any predetermined location, or more than one tray 240 may be detectible at a given location. The detection of a tray, and quantity of items and/or length of a stack of items within a tray 240 may be measured at any point in the transfer process. Further, the quantity of items and/or length of a stack of items within one or more trays may be measured by one or more of tray measuring system 200.

The method begins with block 502, where a source tray is received within the tray measuring system 200. The source tray is received at a tray input similar to 120 and/or 245 as described above. The source tray may be a tray 240 containing items 260 as shown in 2A. Receiving the tray 240 can include an operator placing the tray 240 and/or may include detecting the tray 240 entering the tray input 245. After the tray 240 is received within the tray measuring system 200, the method 500 continues to block 504.

At block 504, a tray measuring device such as the tray measuring device 220 scans the source tray 240. In the example tray measuring system 200, the tray measuring device 220 is a camera. The camera is positioned such that the source tray 240 is within the camera's field of view. In some embodiments, the camera utilizes a marker 250 to calculate an offset angle of the tray measuring device 220 with respect to a normalized plane of the tray input 245. The marker 250 may be affixed to the tray input 245 such that the marker 250 is in the field of view 251 of the tray measuring device 220. Scanning the source tray 240 may include capturing an image of a tray 240 placed on the tray input 245 and transferring the image data to a tray measuring device CPU 222. After the tray measuring device 220 scans the source tray, the method continues to decision state 506.

At decision state 506, the tray measuring device CPU 222 determines whether a source tray 240 placed on the tray input 245 is of a recognized type. The received image from the tray measuring device 220 may be processed by the tray measuring device CPU 222 using a graphical analysis method comprising one or more computer-executable instructions. Additionally, the image captured by the tray measuring device 220 may be processed by the tray measuring device CPU 222 to calculate an offset angle of the tray measuring device 220 with respect to the tray input 245 based upon the existence of the marker 250 within the captured image. The tray measuring device CPU 222 may execute one or more computer-executable instructions utilizing the offset angle to determine the type of tray 240 placed at the tray input 245.

An example computer-executable instruction may include applying a large-kernel gaussian blur to the image received from the tray measuring device 220. Then, the computer-executable instruction may analyze specific pixel locations in the blurred image to determine a type of tray 240. The output of the computer-executable instructions may be one of four possibilities (e.g., the possibilities may include: no tray, or the recognition of one of the USPS postal trays with size designations: MM, EMM, ½ MM).

If, in decision state 506 the tray measuring device CPU 222 determines that a tray 240 is not present at the tray input 245, the method continues to block 516, where the tray measuring system 200 initiates a corrective action. The corrective action can include stopping the tray measuring system 200 process and initiating at least one of the following: signaling alarms such as an audible alarm to an operator, an LED status indicator changing from GREEN to RED, an indicator or warning appearing on a graphical user interface (GUI), and/or a notification to an operator via a connected network such as email or text message. Alternatively, the corrective action may be that the tray measuring system 200 process remains idle until a tray 240 is received at the tray input 245. In some embodiments, when a tray 240 is not detected, the system simply pauses, or takes no action until a tray is detected at the tray input 245 in block 502.

At decision state 508, a one or more processors, such as the tray measuring device CPU 222 determines whether a tray 240 received at the tray input 245 has an estimated length of items 260 that is within a full/empty threshold. The full/empty threshold can be a value based on historical and/or observed operation of mail processing equipment. A full/empty threshold can be determined based on a likelihood of a failure occurring during a transfer of one or more items. For example, when a tray 240 has a quantity of items 260 outside the full/empty threshold (e.g., the tray is too full and/or too empty), mail processing equipment is more likely to experience a failure during the transfer of items from one piece of equipment to another. Failures can include items becoming dislodged, falling out, missing scans, damaged (e.g., bent) and/or the like. In some embodiments, the tray full./empty threshold can be between 5% and 95% full. If a tray does not contain a length or quantity of items between 5% and 90% full, the tray may not meet the full/empty threshold. The tray measuring device CPU 222 of the tray measuring system 200 may compute an estimated total length of items 260 within a tray 240 at the tray input 245 based upon a received image from the tray measuring device 220. Advantageously, one or more computer-executable instructions executed by the tray measuring device CPU may compute an estimated length of items 260 within a tray 240. For example, a computer-executable instruction may determine an analysis region of the captured image file to compute a contour outline of the tray 240 region representing the image's background. Next the computer-executable instruction may calculate the approximate area of the background region of the tray 240 to determine if the total length of items 260 within a tray 240 is below the full threshold and/or above the empty threshold (e.g. the full threshold for example, may be a uniformly organized stack of items 260 exceeding approximately 95% of the tray 240 maximum length, while the minimum threshold may be a uniformly organized stack of items 260 below approximately 5% of the tray 240 maximum length).

In decision state 508, if the tray measuring device CPU 222 determines that the total length and/or quantity of items in a tray is outside the full/empty threshold then the method 500 continues to block 518 where the tray measuring system 200 initiates an action to correct the quantity of items within a tray. The action to correct the items within a tray can include stopping the tray measuring system 200 process and signaling to an operator to add or remove items within the tray such that on the next threshold measurement by the tray measuring device CPU 222, the length of items within a tray is within the full/empty threshold. Additionally, or advantageously, one or more mechanical systems can be employed to automatically add items to a tray or remove items from a tray such that the tray is within the full/empty threshold. In some embodiments, the action can be to cause a conveyor, via, or other system to remove the tray which does not meet the full/empty threshold and divert the tray for processing elsewhere within a distribution network facility, such as a different processing apparatus or to a holding area. Moving the tray to a different location can occur automatically upon detecting the tray does not meet the full/empty threshold.

If, in decision state 508 the tray measuring device CPU 222 determines that a tray 240 contains a total length and/or quantity of items 260 within the full/empty threshold (e.g., the tray measuring device CPU 222 determines that the length of items 260 within a tray 240 is more than 5% full and/or less than 95% full), then the method 500 continues to block 510.

At block 510, the tray measuring device CPU 222 determines the length of a stack of items 260 in a tray. In some embodiments, the stack of items may be a uniformly faced stack of items. In some embodiments, the items, such as letters or flats, can be vertically arranged, with top and bottom surfaces of the letters or flats in contact with each other. The tray-item length may be computed by one or more computer-executable instructions executed by the tray measuring device CPU 222. In an example implementation, the CPU 222 can apply a fast line detector algorithm to find all the lines in the image longer than 20 pixels. Then, a space-partitioning algorithm can be applied to find the nearest neighbor line endpoints. Next, the CPU 222 may apply a filter to the image file such that that only lines representing the slope of the item pieces in the tray image are retained. Then, the CPU 222 extract and sort the line endpoints by the x coordinate. After the extraction step, a pareto algorithm may further filter the image to remove endpoints that do not represent the top line. Next the slope of the lines may be computed and starting with the rightmost item's top edge within the image, and using the slope of the closest item piece, a line is drawn down to the bottom of the tray. The CPU 222 may also use the endpoint at the bottom of the tray image and draw an orthogonal line that crosses the mail background contour line. The determined intersection of the orthogonal line and the contour line is then used to find the length of the orthogonal line, where the length is added to the running total of cross-stack line lengths by multiplying a pixel-per-inch conversion factor to find inches across the stack.

The method 500 then proceeds to block 512, wherein the tray measuring system 200 adjusts fingers 283L and 283R of the intermediate rotary assembly 280 based on the computed tray item length described in block 510. Advantageously, the system 200 can adjust fingers 283L and 283R to reduce the likelihood of one or more failures associated with transferring a stack of items through the mail processing equipment (e.g., preventing one or more items from becoming dislodged, bent, damaged, and/or falling out of the stack). For example, the fingers 283L and 283R can be spaced slightly beyond the determined length of a stack of items, such that when the stack of items is transferred (e.g., from the tray input 245 to the intermediate rotary assembly 280), the items remain as an organized stack.

In an example embodiment, the tray measuring CPU 222 transmits data to the tray content transfer system CPU 224. The data transmitted to the tray content transfer system CPU 224 contains the length of a horizontal stack of items 260 within a tray. After the tray content transfer system CPU 224 receives data corresponding to a length of a horizontal stack of items 260 within a tray, the tray content transfer system CPU 224 computes an initial position for the fingers 283L, and 283R of the intermediate rotary assembly 280. The tray content transfer system CPU 224 then controls the intermediate finger motor 285 and the intermediate finger actuator 286 such that the angular and linear positions of the fingers 283L, 283R of the intermediate rotary assembly 280 are optimally positioned in order for items 260 to be rotationally transferred, as an organized horizontal stack, from the tray input 245 to the intermediate rotary assembly 280.

In another implementation, the data transmitted to the tray content transfer system CPU 224 may be a set of computer-executable instructions requesting the tray content transfer system CPU 224 to execute a predetermined sequence of steps to adjust the intermediate finger motor 285 and the intermediate finger actuator 286. After the tray measuring system 200 adjusts the intermediate finger motors 285 and the intermediate finger actuator 286, the method 500 continues to block 514. At block 514, the method 500 terminates by initiating the transfer of items 260 from the tray 240.

Figure 6:
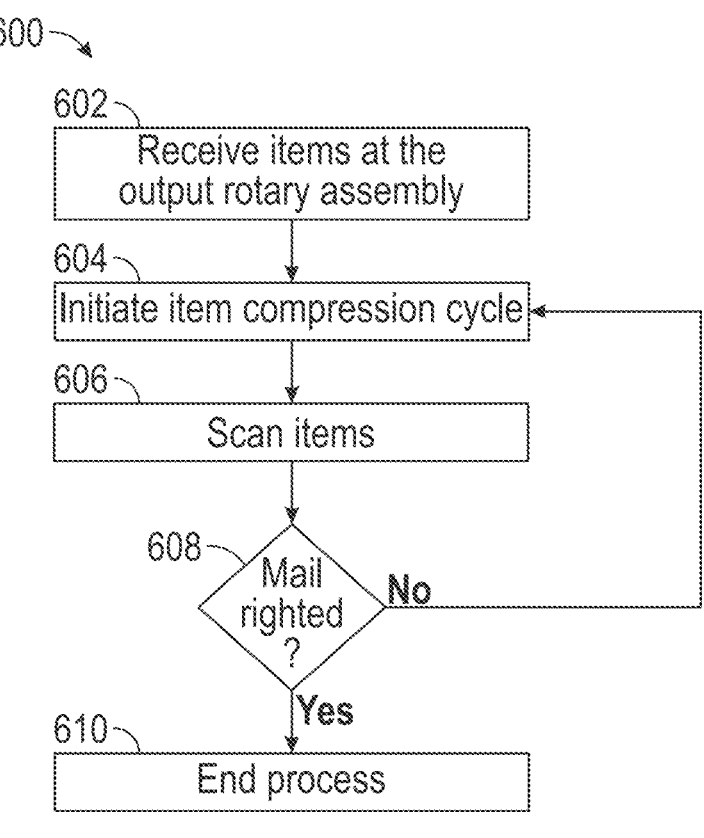
FIG. 6 is a flowchart illustrating an example method for measuring the rightness of items within the output rotary assembly of an item processing system.

FIG. 6 is a flowchart illustrating an example method 600 of obtaining a statistical representation of the average angle of a uniformly faced horizontal stack of items and adjusting components of a righting system accordingly. The method 600 can be performed by a systems such as the processing systems 100, 300, and 400, depicted in FIGS. 1, 3, and/or 4. Although the method 600 is described with reference to the righting detection system 300, it may equally be performed within any of the processing systems described herein. Additionally, the method 600 is described with reference to the output rotary assembly 380, however in another embodiment the method 600 may be implemented at the intermediate rotary assembly 280.

The method 600 begins with block 602, where a stack of items 360 is received at the output rotary assembly 380 of the righting detection system 300. The stack of items 360 may be transferred to the output rotary assembly 380 by a sequence of predetermined steps allowing items 360 to be rotationally transferred from a previous assembly to a location between the output fingers 383L and 383R of the output rotary assembly 380. In some embodiments items 360 are rotationally transferred from in between the fingers 283L, 283R of the intermediate rotary assembly 280. In another implementation, the items 360 may be placed between the fingers 383L and 383R of the output rotary assembly 380 by an operator. Once the items 360 are positioned between the fingers 383L and 383R of the output rotary assembly 380, the method 600 continues to block 604.

Additionally and/or optionally, the righting detection system 300 may initially scan items 360 positioned between fingers 383L, 383R of the output rotary assembly 380 (as described in block 606 below) before initiating one or more compression cycles as described in block 604. Advantageously, the righting detection system 300 can obtain information associated with items between fingers 283L, 283R prior to initiating a compression cycle as described in block 604. For example, the system 300 can perform an initial scan to obtain data associated with items 360, and move or pre-position fingers 383L, 383R such as in the direction of transitional arrow 290 and/or arrow 230, prior to the fingers 383L, 383R making contact with the items in order to minimize the probability of an item falling over prior to stack compression, damage one or more items during an initial compression cycle.

At block 604, the righting detection system 300 initiates one or more item-compression-cycles. With the items 360 positioned between the fingers 383L and 383R of the output rotary assembly 380, the tray content transfer system CPU 324 executes a predetermined sequence of steps, controlling the output finger motor 385 and output finger actuator 386 to compress and then release the fingers 383L, 383R such that any items 360 that are not stacked uniformly may align themselves with other items 360 of the horizontal stack. The fingers 383L, 383R may move in a linear fashion as well as in an angular fashion, through the slots 384 of the platform 382 to compress and release the items 360, to reposition items 360 into a uniform stack. The system can determine a predefined number of compression cycles based on an initial scan of the items, similar to a scan as described with reference to block 606. For example, the system 300 can be configured to execute 1, 5, 10 or more compression cycles based on the results of an initial scan. In some examples, the system 300 can be configured to execute one or more compression cycles if the system 300 determines that the average angle of the items is outside a tolerance. As a specific example, the system 300 may execute 1 (and/or 2, 3, 4 or more) compression cycle if an initial scan determines that the average angle of the stack of items is outside a tolerance by 5, 10, 15, or more degrees. In some embodiments, the number of compression cycles corresponds to the average angle of items in the stack, the position of the items within the tray, or both. In some embodiments, the system 300 can determine an initial number of compression cycles based on a user input. Once a predetermined number of compression cycles of the fingers 383L and 383R has completed, the method 600 continues to block 606.

At block 606, the righting detection system 300 scans items 360 positioned between fingers 383L, 383R of the output rotary assembly 380. The items 360 may be scanned by a righting detection device 320. The righting detection device 320 can be a camera mounted near the output rotary assembly 380 such that the fingers 383L, 383R are in the camera's field of view 351. In some embodiments, the camera is mounted approximately 45 degrees off normal such that the camera will not obstruct a rotational transfer of items 360 from the intermediate rotary assembly 280 to the output rotary assembly 380. A righting detection reference marker 350 can be placed in the righting detection device 320 field of view 351. The righting detection reference marker 350 can be affixed to a predetermined position on the output rotary assembly 380 such that the righting detection reference marker 350 and the fingers 383L, 383R are both within the field of view 351 of the righting detection device 320.

In another implementation, the righting detection reference marker 350 can be affixed to a predetermined position on the intermediate rotary assembly 280 such that the righting detection reference marker 350 and fingers 283L, 283R are both within the field of view 351 of the righting detection device 320.

Scanning the output rotary assembly 380 can include generating an image file, where the image file is created by the righting detection device 320. The image file further contains an image of the uniformly faced horizontal stack of items 360 placed between fingers 383L and 383R and the righting detection reference marker 350. Scanning may further include transmitting the image data to a righting detection device CPU 322. In another implementation, scanning includes capturing an image at the intermediate rotary assembly 280. After the righting detection device 320 scans the items 360 positioned between fingers 383L and 383R, the method continues to decision state 608.

At decision state 608, a CPU, such as the righting detection device CPU 322, determines whether the items 360 between fingers 383L and 383R are righted within a given tolerance (interchangeably called a "threshold"). A stack of items are considered righted when, for example, a determined angle for an edge of one or more items is within a defined tolerance. When items in a stack are righted within a given tolerance (e.g., uniformly positioned, such that each item is standing on an edge, and faces of each item in the stack are positioned back-to-back), mail processing equipment may experience few if any failures (e.g., bent items, dislodged items, damaged items, scanning issues, etc.), while efficiently transferring the stack. Consequently, when items within a stack are not righted (e.g., the items do not meet a tolerance), the stack may be disorganized, causing frequent failures that, among other things, reduce the total throughput of items during mail processing. In some examples, a tolerance can be used to compare all and/or a subset of a computed angle for each edge of a stack of items. In some examples the tolerance can be +/−20 degrees of a normalized vector with respect to a plane parallel from the platform 382.

To determine whether items 360 between fingers 383L and 383R are righted, an image is captured by a righting detection device 320, transmitted and processed by a righting detection device CPU 322 as described below.

The righting detection device CPU 322 determines the statistical average angle of items in the stack of items based on the received image from the righting detection device 320 by first converting the color image captured by the righting detection device 320 to an 8-bit grayscale image. In some embodiments, the initial image may be a grayscale image and color conversion may be unnecessary.

Optionally, the CPU 322 can determine a sub-area of the frame for further processing. The sub-area can be determined based on, for example, a resolution limitation, a processing limitation, and/or other characteristics of one or more sensors, such as the righting detection device 320. The sub-area can be determined based on detection of one or more items in a tray. Advantageously, selecting a sub-area can reduce compute time, increase image processing speeds, and/or minimize the processing power required by, for example, CPU 322.

Next, the CPU 322 runs a fast line detector algorithm on the image using a length threshold to generate an array of lines corresponding to the front edge of each of the items 360 within a stack of items in the image. The length threshold can be set based on image characteristics at a value which ignores vertical lines that may correspond to the sides of the tray or other features in the image which are not items in the tray. In some embodiments, the length threshold can be set to 100 pixels. A person of skill in the art would understand that the length threshold can be set at other values as needed based on the image and camera characteristics.

Next, the CPU 322 determines an angle of each of the array of lines with respect to a reference plane. Advantageously, a filter can be applied to eliminate lines within the array having a computed angle below a lower threshold and above an upper threshold (e.g., the lower threshold may be 5 degrees and upper threshold may be above 175 degrees). The filter is applied to avoid including lines representing mechanical components of the output rotary assembly 380 within the array, stray parts of the image, such as dust, fibers, or other image contaminants.

Next, the CPU 322 produces a histogram. The histogram can organize the computed angle for each item based on a binning value. A binning value can be used to generate a range of angles associated with the histogram, based on a computed angle for one or more items in a stack of items. A binning value can be, for example, 0.01, 0.1, 1, 10 degrees and/or the like. The binning angle can be set by a user and/or determined by, for example, the CPU 322. In some examples, the binning angle can be determined based on the resolution and/or accuracy of one or more sensors, such as for example, the righting detection device 320. In some examples, the binning value can be one degree. After the histogram is generated, a parameterized value of the line angles can be calculated and compared to a righted tolerance. The righted tolerance can be for example, within +/−20 degrees of a normalized vector with respect to a plane parallel to platform 382.

If the righting detection device CPU 322 determines that the parameterized value of line angles is outside a righted tolerance (e.g. the parameterized value is greater than 110 degrees or less than 70 degrees), then the method 600 reverts back to block 604, where the righting detection device CPU 322 may transmit a set of computer-executable instructions to the tray content transfer system CPU 324 to initiate one or more compression cycles, as described above in block 604.

Advantageously, initiating one or more compression cycles can adjust a stack of items to resolve problems occurring during the transfer of items. For example, when items are not righted in mail processing equipment, items have a higher probability of becoming dislodged, falling out, missing scans, and/or the like during a transfer from one piece of equipment to another. Further, items may become bent or damaged if the stack of mail is not properly righted during transfer of a stack of items from one piece of mail processing equipment to another. Such problems can reduce the total throughput of items during mail processing, require operator intervention potentially leading to an increase in safety related interactions between operators and machines, and/or add an additional financial burden resulting from an increased frequency of process and/or machine stop/starts. To resolve problems associated with a stack of items, the righting detection device CPU 322 can generate an instruction to compress the stack of items as described herein, including moving fingers 383 before and/or during a transfer as described herein.

If the righting detection device CPU 322 determines that the parameterized value of line angles is within the righted tolerance (e.g., the parameterized value is within 20 degrees of a normalized vector with respect to a plane parallel to the platform 382), the method 600 continues to block 610. At block 610, the method terminates by initiating a transfer of items 360 from the output rotary assembly 380 to the processing apparatus 395.

Figure 7:
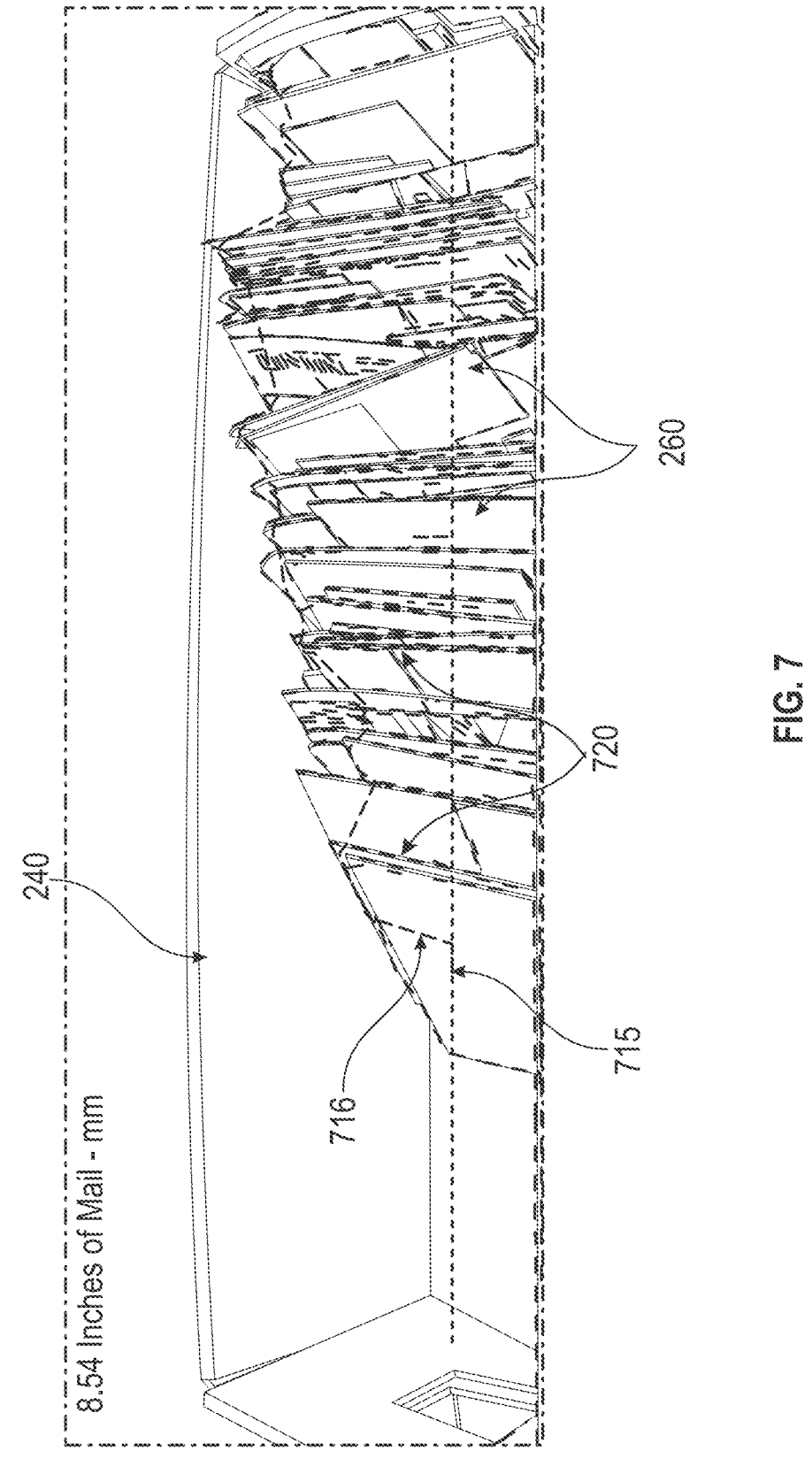
FIG. 7 is an example image generated from a tray measuring device.

FIG. 7 illustrates an example image 710, captured by one or more components of an item processing system (e.g., such as tray measuring device 124, tray measuring system 200, tray measuring device 420 and/or the like). The image 710 captured by the tray measuring device can include a tray 240, along with a various assortment of items 260 within the tray 240, as described in block 504 of FIG. 5. Further, the image 710 can include one or more lines 720. Lines 720 can indicate the slope of the items in the tray image as described in block 510 of FIG. 5. The image 710 can further include a contour line 716 and an orthogonal line 715. The contour line 716 and the orthogonal line 715 can be generated and/or computed as described in block 510 of FIG. 5. As a result of the determined lines 715, 716, and/or 720, the tray measuring device can determine the quantity of items and/or the length of a stack of items 260 within a tray 240. As depicted, the tray measurement device determined that the length of the stack of mail in the tray was approximately 8.54 inches.

Figure 8A:
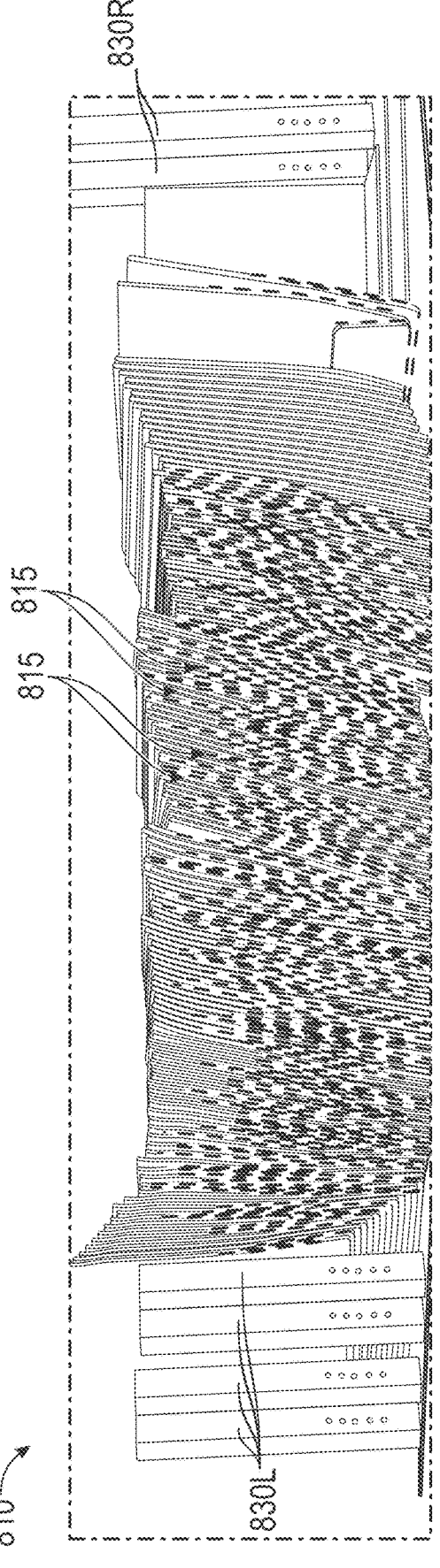
FIG. 8A is an example image generated from an item righting device.
Figure 8B:
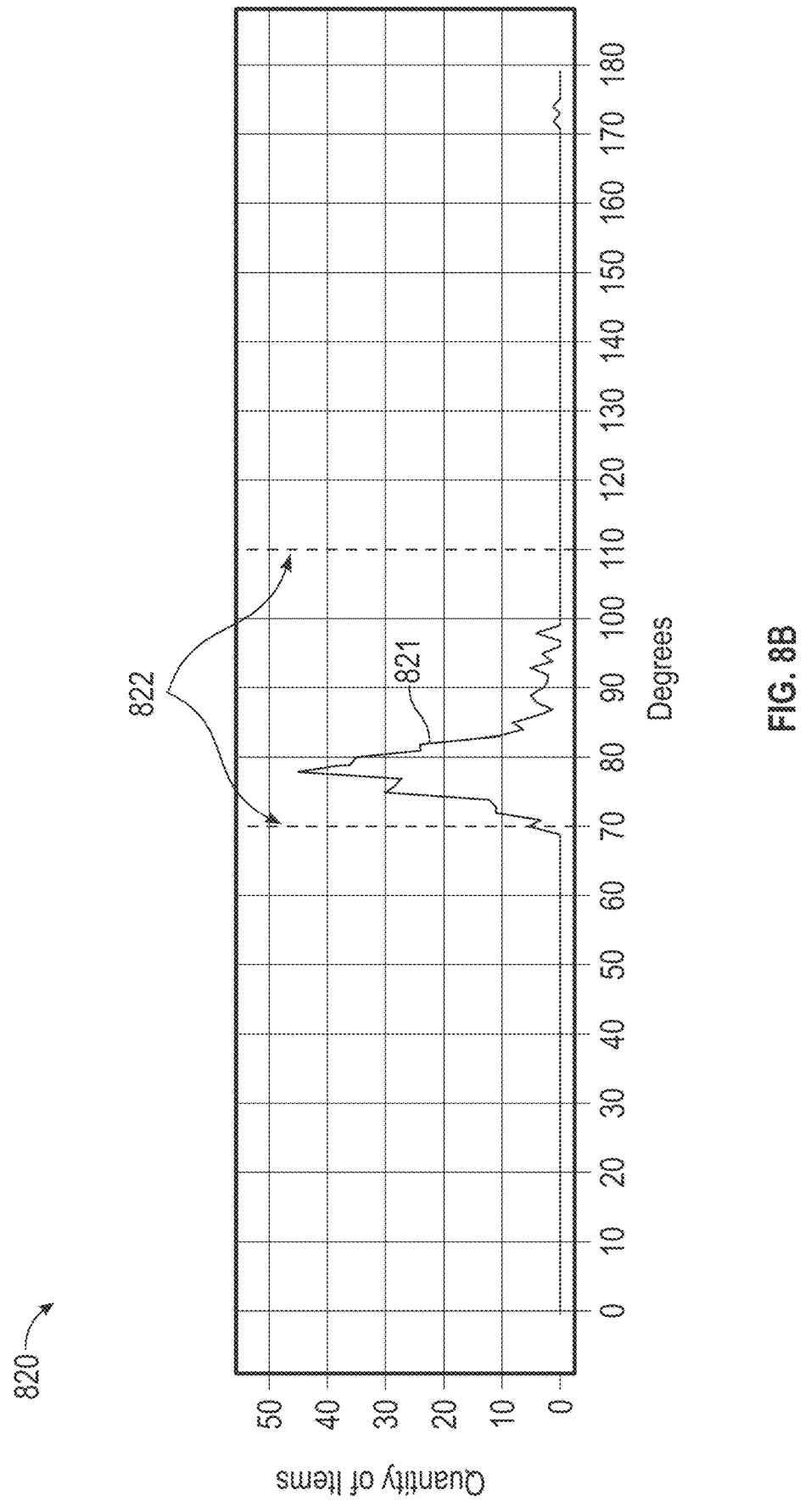
FIG. 8B is an example histogram generated by an item righting device.

FIGS. 8A-8B illustrate an example image 810 and histogram 820 generated by one or more components of an item processing system (e.g., such as righting detection device 146, righting detection system 300, item righting detection device 440 and/or the like) while the one or more components of an item processing system scans a stack of items between right paddles 830R and left paddles 830L (e.g., similar to and/or the same as fingers 283L and 283R, and/or 383L and 383R) of a mail processing equipment.

As illustrated in FIG. 8A, a righting detection device can capture an image 810 of a stack of items between right paddles 830R and left paddles 830L such that an image processing algorithm may determine the edge of each item within the stack as described in block 606 of FIG. 6. The image 810 shows the plurality of lines 815 corresponding to detected edges. In some embodiments, the righting detection device can detect the edge of each piece in the stack of items. In some embodiments, the righting detection device can detect a subset of edges, and/or can generate a detected edge illustrative of a portion of the stack of items, or an average of items in a certain portion or length of the stack of items as described in block 606 and decision state 608 of FIG. 6.

FIG. 8B illustrates a histogram 820 representing the approximate angle of each item within a stack of items, for example as illustrated in FIG. 8A. FIG. 8B includes a threshold 822 and line 821. The threshold 822 and/or line can be generated by, for example, the righting detection device 146, righting detection system 300, item righting detection device 440 and/or the like. The threshold 822 can represent a tolerance to compare all and/or a subset of edges, to determine whether items between for example, right paddles 830R and left paddles 830L of FIG. 8A, are righted. Further histogram 820 includes line 821. The line 821 can indicate the results of a computed angle based on the detected edge for one or more items as described in block 606 of FIG. 6. Further, the image processing algorithm may determine whether a representative quantity of a stack of items, as depicted by line 821, is within a threshold 822 before the stack of items are transferred to a next process of the mail processing equipment, as described in decision state 608 and block 610 of FIG. 6. The histogram 820 illustrates that the majority of the computed edges of one or more items have an angle close to approximately 78 degrees.

As depicted, when the approximate average angle of each item within a stack is within a threshold 822, (e.g., +/−20 degrees of 90 degrees), then the image processing algorithm may determine that the stack of items is righted (e.g., decision state 608 and/or block 610 of FIG. 6. The average angle of each item can be determined by determining the angle of the plurality of lines 815 of FIG. 8A, with reference to a horizontal and/or vertical plane. Conversely, if the image processing algorithm determines that the stack of items is not within a threshold 822, the image processing algorithm may send a signal to cause the mail processing equipment to compress the stack of items as described in block 604 of FIG. 6. Further, the righting detection device may scan the items again as described in block 606 of FIG. 6 and repeat the sequence until the stack is righted. Additionally, if the image 810 captured by the righting detection device is of poor quality because, for example, the camera's field of view is obstructed by environmental conditions such as poor lighting, the item processing algorithm can signal to the mail processing equipment that an error has occurred, and/or trigger a corrective action such as any of the corrective actions described above in FIG. 5.

The foregoing description details contain embodiments of the systems, devices, and methods disclosed herein. It will be appreciated, however, that no matter how detailed the foregoing appears in text, the systems, devices, and methods can be practiced in many ways. It should be noted that the use of particular terminology when describing certain features or aspects of the invention should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the figures may be combined, interchanged, or excluded from other embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

All references cited herein are incorporated herein by reference in their entirety. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

It is noted that some examples above may be described as a process, which is depicted as a flowchart, a flow diagram, a structure diagram, or a block diagram. Although a flowchart may describe the operations as a sequential process, many of the operations can be performed in parallel, or concurrently, and the process can be repeated. In addition, the order of the operations may be rearranged. A process is terminated when its operations are completed. A process may correspond to a method, a function, a procedure, a subroutine, a subprogram, etc. When a process corresponds to a software function, its termination corresponds to a return of the function to the calling function or the main function.

The above description discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it covers all modifications and alternatives coming within the true scope and spirit of the invention as embodied in the attached claims.

What is claimed:

1. A system comprising:
   an assembly comprising:
   a platform having a plurality of slots, and
   a plurality of fingers extending through the plurality of slots, the plurality of fingers configured to support one or more items therebetween;

one or more sensors configured to detect a characteristic associated with at least one item; and a controller configured to:

receive, from the one or more sensors, the characteristic associated with at least one item;

based on the received characteristic associated with the at least one item, determine a distance between the plurality of fingers; and move the plurality of fingers based on the determined distance.

2. The system of claim 1, wherein the controller is further configured to:

in response to receiving, from the one or more sensors, the characteristic associated with at least one item, determine a tray type at the assembly;

estimate a quantity of items associated with the determined tray type; and based on the determined tray type and the estimated quantity of items associated with the tray type, determine a length of the items in a tray.

3. The system of claim 1, further comprising:

a second assembly comprising:

a second platform having a plurality of second slots, and a plurality of second fingers extending through the plurality of second slots, the plurality of second fingers configured to support the one or more items therebetween;

wherein the controller is further configured to:

move the plurality of second fingers based on the received characteristic associated with at least one item; and rotate the assembly and the second assembly, to translate the assembly and the second assembly in a predetermined sequence to transfer the one or more items from a tray to an output location.

4. The system of claim 1, wherein the controller is further configured to:

rotate the assembly, to translate the assembly in a predetermined sequence to transfer the one or more items from a tray to an output location.

5. The system of claim 1, further comprising:

at least a subset of the plurality of fingers are configured to retract from an extended position beyond the platform to a lowered position below the platform, the lowered position permitting items to slide along the platform over the retractable plurality of fingers.

6. The system of claim 5, wherein the controller is further configured to:

retract the subset of the plurality of fingers based on the received characteristic associated with at least one item.

7. The system of claim 1, wherein a first sensor of the one or more sensors is a tray detection device affixed such that a field of view of the tray detection device encompasses the one or more items at the assembly.

8. The system of claim 7, wherein the controller is further configured to:

generate an image of the assembly in response to receiving the characteristic associated with at least one item from the tray detection device, wherein the image of the assembly comprises at least a tray and one or more items;

process the image to determine a tray type for the tray;

estimate, based on the processed image, a quantity of items in the tray; and determine a length of items in the tray based on the determined tray type and the estimated quantity of items in the tray.

9. The system of claim 7, wherein the tray detection device further comprises:

a marker affixed such that the tray detection device field of view encompasses the assembly and the marker.

10. The system of claim 9, wherein the controller is further configured to:

generate an image of the assembly in response to receiving the characteristic associated with at least one item from the tray detection device, wherein the image of the assembly includes at least a tray;

process the image to calculate an offset angle between the tray detection device and the assembly, the calculated offset angle determined based on one or more characteristics of the marker included in the image;

based on the processed image and the offset angle, determine a tray type for the tray;

estimate, based on the processed image and the offset angle, a quantity of items in the tray; and determine a length of the items in the tray based on the determined tray type and the estimated quantity of items in the tray.

11. A system comprising:

an assembly including a platform having a plurality of slots, and a plurality of fingers extending through the plurality of slots, the plurality of fingers configured to support one or more items therebetween;

one or more sensors configured to detect a characteristic associated with at least one item; and a controller, wherein the controller is configured to:

receive, from the one or more sensors, the characteristic associated with at least one item;

based on the received characteristic associated with the at least one item, determine an angle of the at least one item, and move the plurality of fingers based on the determined angle of the at least one item.

12. The system of claim 11, wherein the controller is further configured to:

determine an edge for at least one of the one or more items in response to receiving, from the one or more sensors, the characteristic associated with at least one item;

estimate, based on the determined edge and a reference plane, a plurality of angles for the one or more items; and based on the determined edge and the estimated plurality of angles for the one or more items, determine an average angle of the one or more items.

13. The system of claim 11, wherein the controller is further configured to:

compare the determined angle of the at least one item to a threshold, wherein if the determined angle is within the threshold, move the plurality of fingers such that the one or more items are transferred in a predetermined sequence to an output location, and wherein if the determined angle is outside the threshold, initiate a sequence of steps such that the plurality of fingers compress the items.

14. The system of claim 11, wherein at least a subset of the plurality of fingers are configured to retract from an extended position beyond the platform to a lowered position below the platform, the lowered position permitting items to slide along the platform over the subset of the plurality of fingers.

15. The system of claim 14, the controller further configured to:

compare the determined angle of the at least one item to a threshold, wherein if the determined angle is within the threshold, move the plurality of fingers such that the one or more items are transferred in a predetermined sequence to an output location, and wherein if the determined angle is outside the threshold, initiate a sequence of steps by retracting, extending, and sliding the plurality of fingers, such that the plurality of fingers compress the items.

16. The system of claim 11, wherein a first sensor of the one or more sensors is an item righting detection device affixed such that a field of view of the item righting detection device encompasses the one or more items.

17. The system of claim 16, wherein the controller is further configured to:

generate an image of the one or more items in response to receiving, from the righting detection device, the characteristic associated with at least one item;

process the image to determine an edge for at least one of the one or more items;

estimate, based on the determined edge for the one or more items and a reference plane, a plurality of angles for the one or more items; and determine an average of the plurality of angles for the one or more items based on the determined plurality of angles for the one or more items.

18. The system of claim 16, wherein the item righting detection device further comprises:

a marker affixed such that the item righting detection device field of view encompasses the one or more items and the marker.

19. The system of claim 18, wherein the controller is further configured to:

generate an image of the one or more items in response to receiving from the item righting detection device, the characteristic associated with at least one item;

process the image to determine an edge for at least one of the one or more items;

determine an offset angle of the item righting detection device with respect to a reference plane, the offset angle determined based on one or more characteristics of the marker included in the image;

estimate a plurality of angles for the one or more items based on the processed image, the offset angle, and the edge for the one or more items; and based on the plurality of angles for the one or more items, determine an average angle, wherein the average angle is an average of the plurality of angles for the one or more items.

20. A method for optimizing a transfer of items, the method comprising, by an automated process:

receiving one or more items at a first assembly within a content transfer system;

receive, from one or more sensors, a characteristic associated with at least one item at the first assembly;

based on the received characteristic associated with the at least one item, determine a first distance between a plurality of first fingers;

move the plurality of first fingers based on the determined first distance;

based on the received characteristic associated with at least one item, determine a second distance between a plurality of second fingers;

move the plurality of second fingers based on the determined second distance; and rotate the first assembly and the second assembly, to translate the first and the second assembly in a predetermined sequence to transfer the one or more items to an output location.

\* \* \* \* \*